United States Patent
Fumikura et al.

(12) United States Patent
(10) Patent No.: US 11,073,498 B2
(45) Date of Patent: Jul. 27, 2021

(54) DETECTION SYSTEM, DETECTION DEVICE, AND DETECTION METHOD

(71) Applicant: KABUSHIKI KAISHA TOSHIBA, Tokyo (JP)

(72) Inventors: Tomoya Fumikura, Kanagawa (JP); Takahiro Omori, Kanagawa (JP); Kazuo Watabe, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 91 days.

(21) Appl. No.: 16/286,764

(22) Filed: Feb. 27, 2019

(65) Prior Publication Data
US 2020/0018729 A1    Jan. 16, 2020

(30) Foreign Application Priority Data
Jul. 13, 2018  (JP) .............................. JP2018-133648

(51) Int. Cl.
| | |
|---|---|
| *G01N 29/04* | (2006.01) |
| *G01N 29/07* | (2006.01) |
| *G01N 29/44* | (2006.01) |
| *G01N 29/14* | (2006.01) |

(52) U.S. Cl.
CPC ........... *G01N 29/14* (2013.01); *G01N 29/043* (2013.01); *G01N 29/07* (2013.01); *G01N 29/44* (2013.01); *G01N 2291/0258* (2013.01); *G01N 2291/106* (2013.01); *G01N 2291/267* (2013.01)

(58) Field of Classification Search
CPC ...... G01N 29/07; G01N 29/043; G01N 29/14; G01N 29/44; G01N 29/4427; G01N 29/46; G01N 2291/011; G01N 2291/106; G01N 2291/0232; G01N 2291/267; G01N 2291/0258
USPC .......................................................... 73/587
See application file for complete search history.

(56) References Cited

U.S. PATENT DOCUMENTS

| | | | | |
|---|---|---|---|---|
| 5,679,998 | A | * 10/1997 | Toda | ..................... G06F 3/0436 310/313 D |
| 2016/0282310 | A1 | * 9/2016 | Usui | ...................... G01N 29/14 |
| 2017/0138910 | A1 | 5/2017 | Usui et al. | |
| 2020/0217822 | A1 | * 7/2020 | Someda | ............... G01N 29/223 |

FOREIGN PATENT DOCUMENTS

| | | | |
|---|---|---|---|
| CN | 207703372 | * | 8/2018 |
| CN | 110161118 | * | 8/2019 |
| JP | S61-284657 A | | 12/1986 |
| JP | 2006084454 | * | 3/2006 |
| JP | 2007-285813 A | | 11/2007 |
| JP | 2010-54497 A | | 3/2010 |
| JP | 2010-271196 A | | 12/2010 |
| JP | 2013-170936 A | | 9/2013 |

(Continued)

*Primary Examiner* — Jacques M Saint Surin
(74) *Attorney, Agent, or Firm* — Finnegan, Henderson, Farabow, Garrett & Dunner L.L.P.

(57) ABSTRACT

According to one embodiment, a detection system of an embodiment includes a sensor configured to detect elastic waves and a determiner. The determiner determines a region where an elastic wave generation source is positioned on the basis of waveform information if the waveform information including a plurality of peak groups related to one elastic wave is included in a detection result of the sensor.

24 Claims, 24 Drawing Sheets

(56) References Cited

FOREIGN PATENT DOCUMENTS

| | | |
|---|---|---|
| JP | 5633059 B | 12/2014 |
| JP | 2017-90311 A | 5/2017 |
| WO | WO2018235195 | * 12/2018 |

* cited by examiner

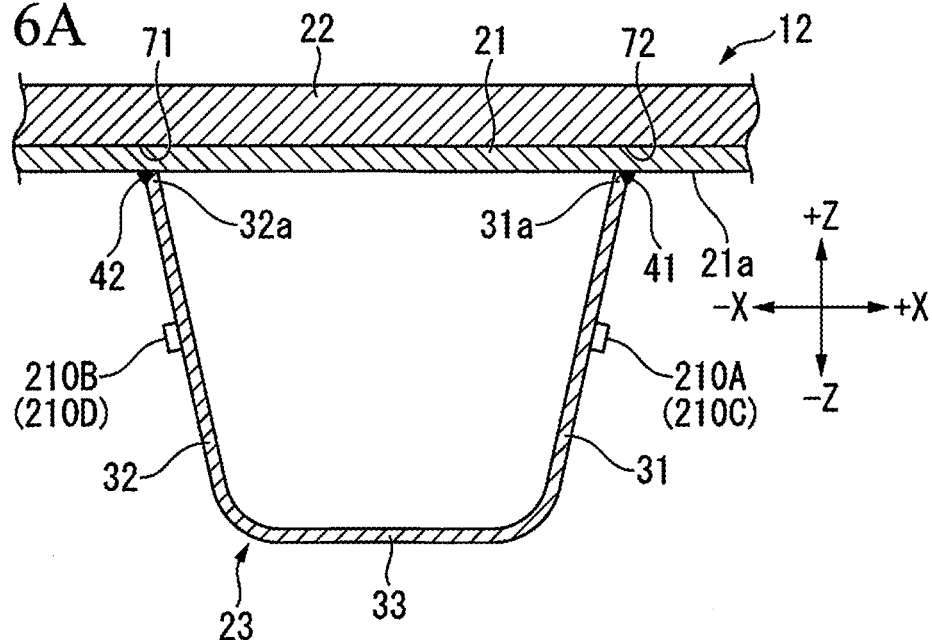
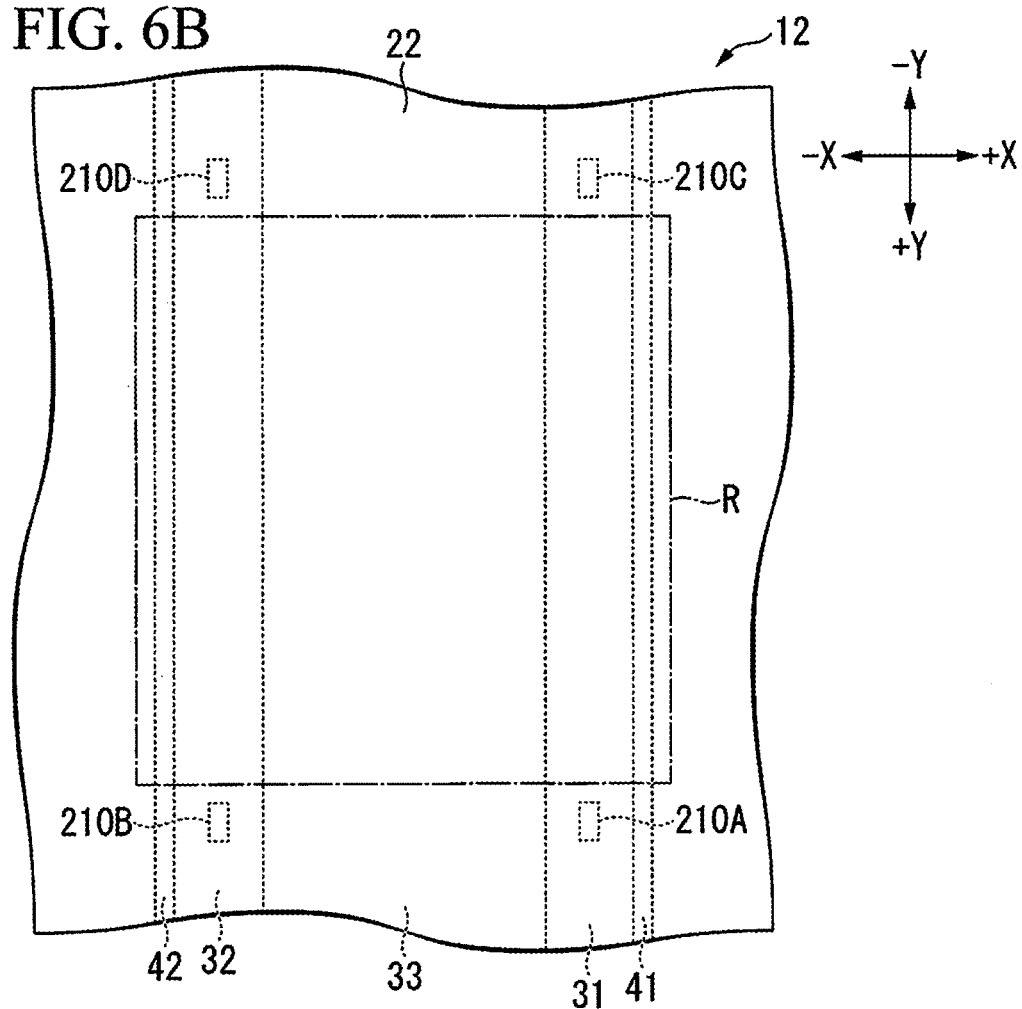

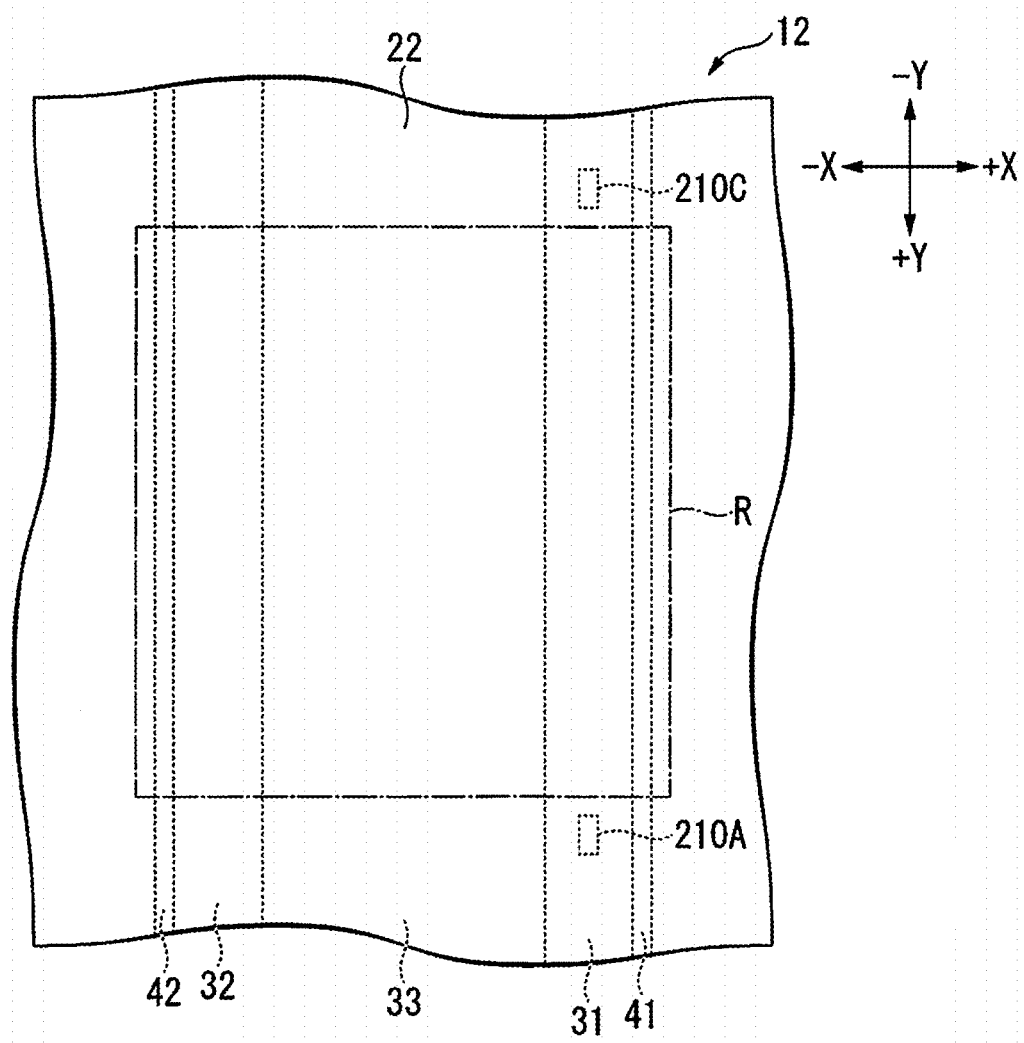

| SECOND AE SENSOR | | | | |
| --- | --- | --- | --- | --- |
| FIRST AE SENSOR | | | | |
| X COORDINATE | Y COORDINATE | TIME DIFFERENCE | DURATION TIME | AMPLITUDE |
| ○○ | ○○ | ○○ | ○○ | ○○ |
| ○○ | ○○ | ○○ | ○○ | ○○ |
| ⋮ | ⋮ | ⋮ | ⋮ | ⋮ |

… # DETECTION SYSTEM, DETECTION DEVICE, AND DETECTION METHOD

CROSS-REFERENCE TO RELATED APPLICATION

This application is based upon and claims the benefit of priority from Japanese Patent Application No. 2018-133648, filed on Jul. 13, 2018, the entire contents of which are incorporated herein by reference.

FIELD

Embodiments described herein relate generally to a detection system, a detection device, and a detection method.

BACKGROUND

For example, structures such as bridges deteriorate with long-term general use of the structures. As a technique for detecting such deterioration, a technique using an acoustic emission (AE) sensor has been proposed.

Meanwhile, the above-described technique may be more preferable when it is possible to improve accuracy in determining a deterioration position.

BRIEF DESCRIPTION OF THE DRAWINGS

FIG. 6A is a cross-sectional view illustrating an arrangement example of four AE sensors according to the first embodiment.

FIG. 6B is a plan view illustrating an arrangement example of four AE sensors according to the first embodiment.

FIG. 18 is a plan view illustrating an arrangement example of two AE sensors according to the second embodiment.

FIG. 20 is a diagram illustrating an example of details of a database according to the second embodiment.

DETAILED DESCRIPTION

Figure 1:
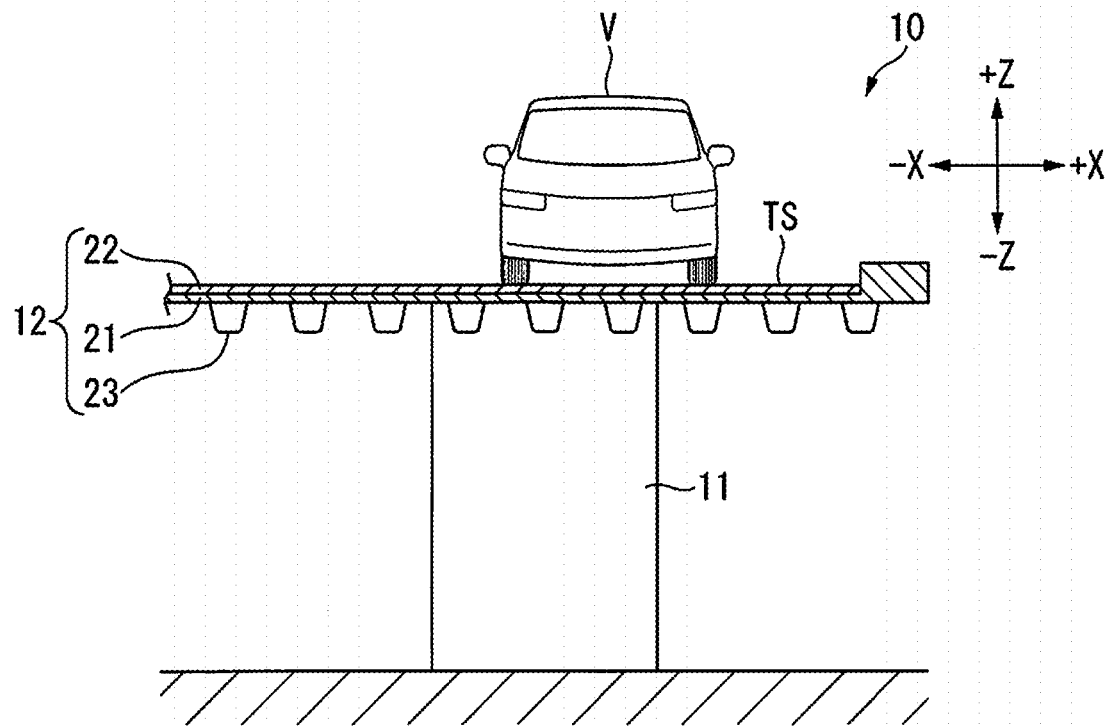
FIG. 1 is a cross-sectional view illustrating an example of a structure for describing a first embodiment.

The present invention provides an objective of the present invention is to provide a detection system, a detection device, and a detection method capable of improving accuracy in determining a deterioration position.

According to one embodiment, a detection system of an embodiment includes a sensor configured to detect elastic waves and a determiner. The determiner determines a region where an elastic wave generation source is positioned on the basis of waveform information if the waveform information including a plurality of peak groups related to one elastic wave is included in a detection result of the sensor.

Hereinafter, a detection system, a detection device, and a detection method of embodiments will be described with reference to the drawings. Also, in the following description, components having the same or similar functions are denoted by the same reference signs. Redundant description of these components may be omitted. In the present specification, a "detection result of a sensor" and an "output value of a sensor" are not limited to information or a value directly output from the sensor, and may be information or a value obtained by performing signal amplification, noise cancellation, additional calculation or processing, or the like on the information or the value output from the sensor. Also, the term "based on XX" used in the present specification means "based on at least XX", and also includes a case based on another element in addition to XX. Furthermore, the term "based on XX" is not limited to a case in which XX is directly used and also includes a case based on a result obtained by performing calculation or processing on XX. "XX" is any element (for example, any information).

Also, a +X direction, a −X direction, a +Y direction, a −Y direction, a +Z direction, and a −Z direction are defined. The +X direction, the −X direction, the +Y direction, and the −Y direction are, for example, directions taken along a lower surface 21a of a deck plate 21 to be described below (see FIG. 3). The +X direction is, for example, a direction from a second upright portion 32 of a U-rib 23 to a first upright portion 31. The −X direction is the direction opposite to the +X direction. When the +X direction and the −X direction are not distinguished, they are simply referred to as an "X direction". The +Y direction and the −Y direction are directions intersecting (for example, approximately orthogonal to) the X direction. The +Y direction is, for example, a direction from a third AE sensor 210C to a first AE sensor 210A (see FIG. 6B). The −Y direction is opposite to the +Y direction. When the +Y direction and the −Y direction are not distinguished, they are simply referred to as a "Y direction". The "Y direction" is an example of a bridge axis direction. The +Z direction and the −Z direction are directions intersecting (for example approximately orthogonal to) the X direction and the Y direction. The +Z direction is a direction from the U-rib 23 to the deck plate 21 (see FIG. 3). The −Z direction is the direction opposite to the +Z direction. When the +Z direction and the −Z direction are not distinguished, they are simply referred to as a "Z direction".

First Embodiment

A detection system 100 of a first embodiment will be described with reference to FIGS. 1 to 16. The detection system 100 is a system for detecting a deteriorated state (for example, a cracked state) of a structure.

First, an example of a structure to which the detection system 100 of the present embodiment is applied will be described. However, the application of the detection system 100 is not limited to the following example. That is, a structure 10 may be a structure other than a steel plate deck.

<1. Example of Structure>

FIG. 1 is a cross-sectional view illustrating an example of the structure 10. The structure 10 is, for example, a bridge or the like, and includes bridge piers 11 and a steel plate deck 12. The bridge piers 11 are provided on the ground and upright in an approximately vertical direction. The steel plate deck 12 is installed on the bridge piers 11 to form a traveling surface TS on which a vehicle V travels.

Figure 2:
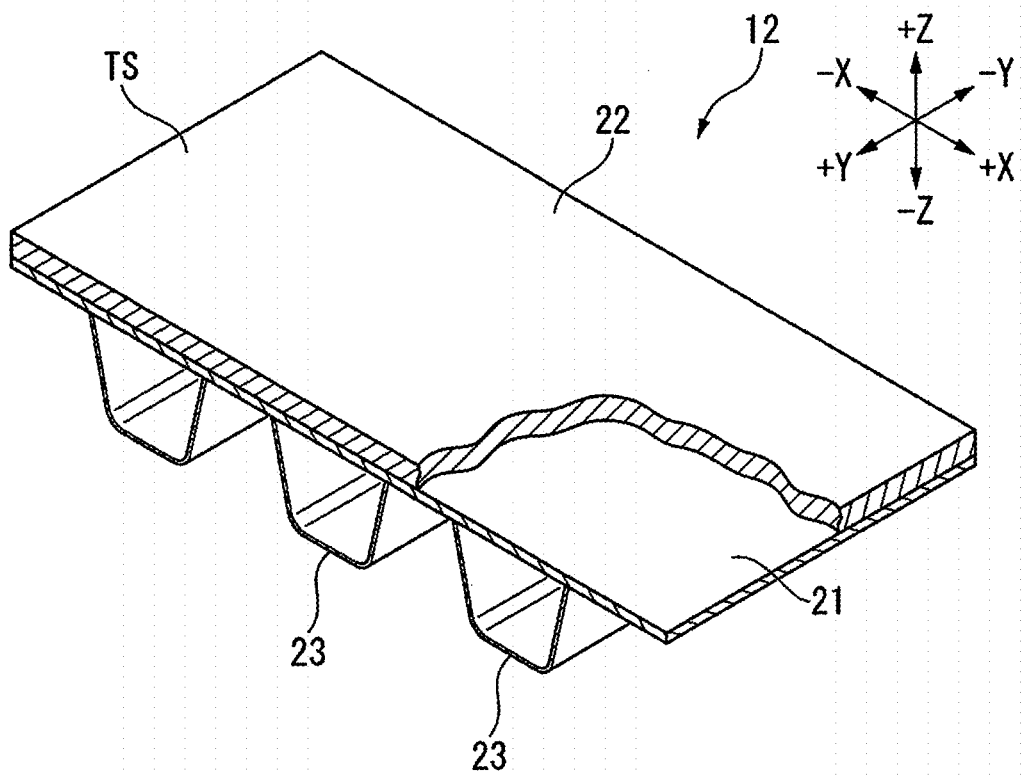
FIG. 2 is a cross-sectional perspective view illustrating a steel plate deck for describing the first embodiment.

FIG. 2 is a cross-sectional perspective view illustrating the steel plate deck 12. The steel plate deck 12 includes, for example, the deck plate 21, a paved portion 22, and the U-rib (a trough rib) 23. The deck plate 21 spreads under the traveling surface TS on which the vehicle V travels and supports the traveling surface TS from below. The deck plate 21 is, for example, a metallic plate member spreading approximately parallel to the traveling surface TS. The paved portion 22 is provided on an upper surface of the deck plate 21. The paved portion 22 is formed of, for example, asphalt or the like. An upper surface of the paved portion 22 forms the traveling surface TS on which the vehicle V travels.

The U-rib 23 is installed on a lower surface of the deck plate 21. The U-rib 23 is a metallic rib having a U-shaped cross-sectional shape and is a reinforcing member for reinforcing the deck plate 21.

The U-rib 23 extends in the bridge axis direction (the Y direction). The "bridge axis direction" is, for example, a direction in which the structure 10, which is a bridge, extends and is a direction taken along a traveling direction of the vehicle V that travels through the structure 10.

Figure 3:
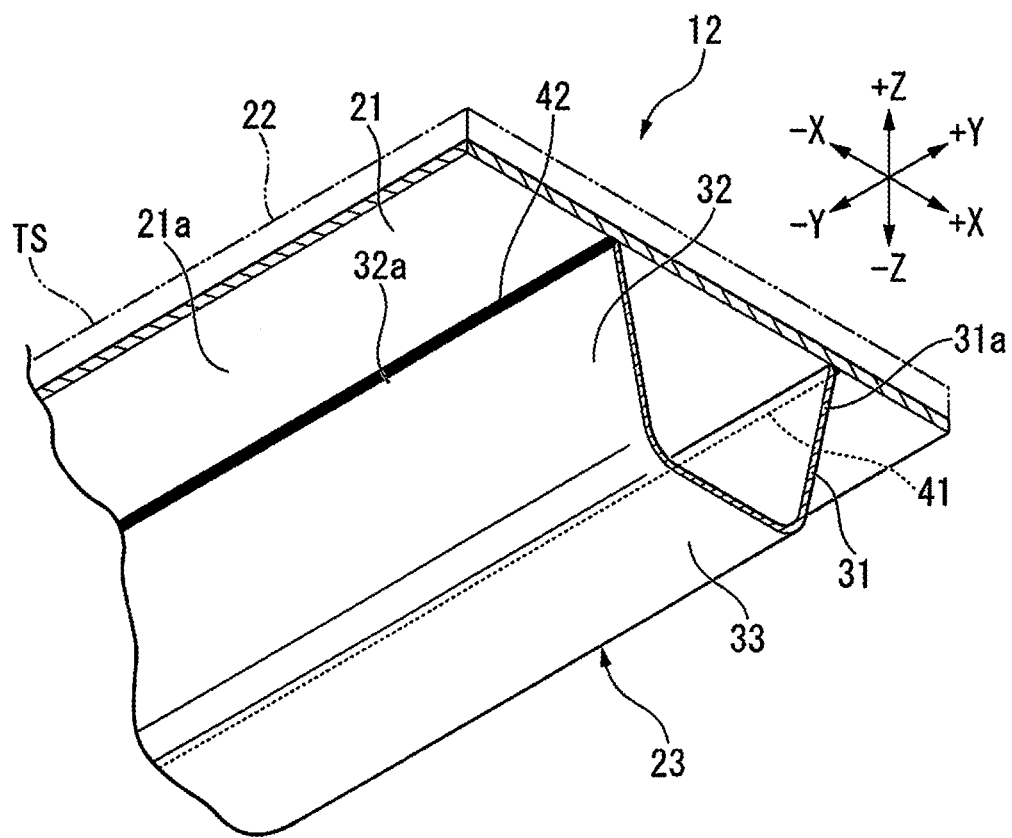
FIG. 3 is a cross-sectional perspective view of the steel plate deck when obliquely viewed from below for describing the first embodiment.

FIG. 3 is a cross-sectional perspective view of the steel plate deck 12 when obliquely viewed from below. The U-rib 23 includes, for example, a pair of upright portions 31 and 32 (first and second upright portions 31 and 32) and a horizontal portion 33.

The upright portions 31 and 32 are separated from each other in the X direction. The upright portions 31 and 32 are plate portions in the direction intersecting the traveling surface TS, respectively, and extend in a direction away from the traveling surface TS. For example, the upright portions 31 and 32 are inclined with respect to each other so that a distance between the upright portions 31 and 32 gradually narrows as the distance from the traveling surface TS increases. The horizontal portion 33 is a plate portion approximately parallel to the lower surface 21a of the deck plate 21. The horizontal portion 33 is provided between lower ends of the upright portions 31 and 32 and connects the lower ends of the upright portions 31 and 32. The U-rib 23 is formed in a U shape by connecting the upright portions 31 and 32 and the horizontal portion 33.

Next, the welded portions 41 and 42 included in the steel plate deck 12 will be described.

The steel plate deck 12 has a pair of welded portions 41 and 42 (first and second welded portions 41 and 42) between the deck plate 21 and the U-rib 23. Specifically, the first upright portion 31 of the U-rib 23 has an end (first end) 31a facing the lower surface 21a of the deck plate 21. The second upright portion 32 of the U-rib 23 has an end (second end) 32a facing the lower surface 21a of the deck plate 21. The first welded portion 41 is provided along the end 31a of the first upright portion 31 of the U-rib 23 and extends in the bridge axis direction. The first welded portion 41 fixes (connects) the end 31a of the first upright portion 31 to the lower surface 21a of the deck plate 21. The second welded portion 42 is provided along the end 32a of the second upright portion 32 of the U-rib 23 and extends in the bridge axis direction. The second welded portion 42 fixes (connects) the end 32a of the second upright portion 32 to the lower surface 21a of the deck plate 21.

Figure 4:
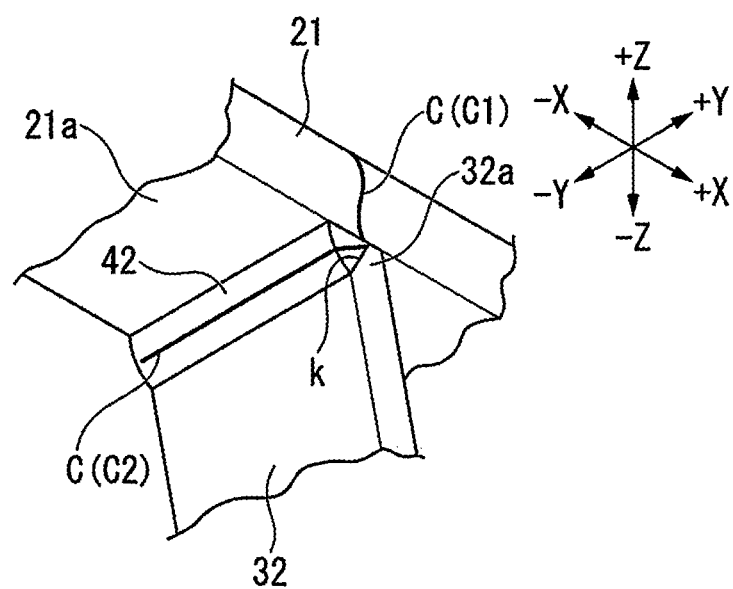
FIG. 4 is a cross-sectional perspective view illustrating an example of an end of a second upright portion and its vicinity for describing the first embodiment.

FIG. 4 is a cross-sectional perspective view illustrating an example of the end 32a of the second upright portion 32 and its vicinity. In FIG. 4, for convenience of description, hatching of a cross section is omitted. For example, the end 32a of the second upright portion 32 includes an inclined portion (an inclined surface) k. The inclined portion k is provided at an outer side portion of the pair of upright portions 31 and 32 at the end 32a of the second upright portion 32. The inclined portion k is inclined in a direction away from the lower surface 21a of the deck plate 21 as the inclined portion k goes outside the pair of upright portions 31 and 32. At least a part of the second welded portion 42 is inserted between the lower surface 21a of the deck plate 21 and the inclined portion k of the second upright portion 32. A configuration of the first upright portion 31 and the first welded portion 41 is similar to that of the second upright portion 32 and the second welded portion 42. However, the shapes of the ends 31a and 32a of the first and second upright portions 31 and 32 and the shapes of the first and second welded portions 41 and 42 are not limited to the above examples.

In each of the first and second welded portions 41 and 42, cracks C may occur due to fatigue according to long-term use of the structure 10. The cracks C are roughly divided into two patterns. Cracks C1 of a first pattern are cracks (deck plate penetrating cracks) developing from bases (base portions) of the welded portions 41 and 42 to the deck plate 21. On the other hand, cracks C2 of a second pattern are cracks (bead penetrating cracks) developing from the bases of the welded portions 41 and 42 to weld beads. The detection system 100 of the present embodiment detects, for example, elastic waves generated in the structure 10 due to generation or development of these cracks C1 and C2.

<2. Detection System>
<2.1 Overall Configuration>

Figure 5:
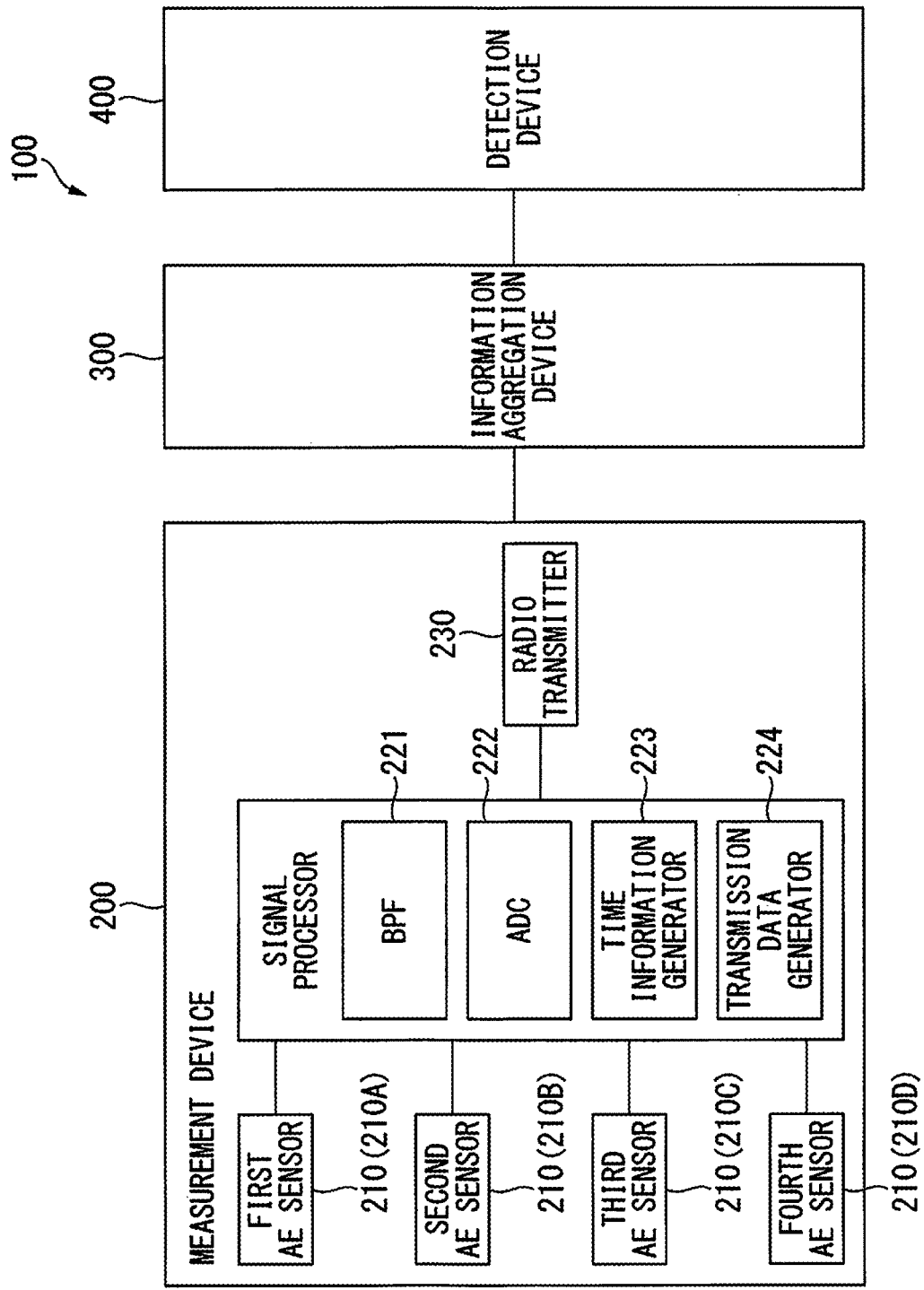
FIG. 5 is a block diagram illustrating a system configuration of a detection system according to the first embodiment.

Next, the detection system 100 will be described. First, an overall configuration of the detection system 100 will be described. FIG. 5 is a block diagram illustrating a system configuration of the detection system 100.

The detection system 100 includes, for example, a measurement device 200, an information aggregation device 300, and a detection device (information processing device) 400.

The measurement device 200 is installed in the structure 10 and detects elastic waves generated in the structure 10.

The measurement device 200 includes, for example, a plurality of AE sensors 210, a signal processor 220, and a radio transmitter 230.

Each of the plurality of AE sensors 210 has, for example, a piezoelectric element, detects elastic waves (AE waves) transmitted from an elastic wave generation source, converts the detected elastic waves into a voltage signal (an AE signal), and outputs the voltage signal (the AE signal). The AE sensor 210 has, for example, a piezoelectric element having sensitivity in a range of 10 kHz to 1 MHz. The AE sensor 210 may be either of a resonance type having a resonance peak in the frequency range and a broadband type in which resonance is minimized. Also, the AE sensor 210 is not limited to a specific type, and various AE sensors can be widely used. An arrangement example of the AE sensors 210 will be described below in detail. Here, the AE sensor 210 is an example of a "sensor". However, the "sensor" described in this specification is not limited to an AE sensor. For example, instead of the AE sensor 210, an acceleration sensor may be used. In this case, the acceleration sensor outputs a signal processed signal to the signal processor 220 by performing a process similar to that of the AE sensor 210.

The signal processor 220 receives voltage signals output from the plurality of AE sensors 210 and performs a predetermined process on the received voltage signals. The signal processor 220 includes, for example, a band pass filter (BPF) 221, an analog to digital converter (ADC) 222, a time information generator 223, and a transmission data generator 224. The BPF 221 removes noise from the voltage signal received from the AE sensor 210. The ADC 222 converts the voltage signal from which noise has been removed by the BPF 221 into discretized waveform data. The time information generator 223 generates time information on the basis of a signal from a clock source such as a crystal oscillator. The transmission data generator 224 associates information measured by the AE sensor 210 with the time information on the basis of the time information generated by the time information generator 223. For example, the transmission data generator 224 generates time-series data in which waveform data discretized by the ADC 222 and a measurement time at which the voltage signal serving as the basis of the waveform data has been measured are associated. The transmission data generator 224 outputs the generated time-series data to the radio transmitter 230. The signal processor 220 is implemented by hardware (a circuit unit including circuitry) such as large scale integration (LSI), an application specific integrated circuit (ASIC), and a field-programmable gate array (FPGA).

The radio transmission unit (radio transmission circuit) 230 includes, for example, an antenna and a radio module that generates a high-frequency signal. The radio transmitter 230 wirelessly transmits information (for example, time-series data) generated by the transmission data generator 224 to the information aggregation device 300. Moreover, the measurement device 200 may be wired to the information aggregation device 300 and may transmit information through a wire.

The information aggregation device 300 includes, for example, an antenna and a radio module for processing a high-frequency signal. The information aggregation device 300 receives the time-series data from one or more measurement devices 200 installed in the structure 10 and outputs the received time-series data to the detection device 400. However, the information aggregation device 300 may be omitted. That is, the detection device 400 may directly receive information from the measurement device 200.

The detection device 400 is, for example, an electronic device (for example, a server) installed in a management office of an organization that manages the structure 10. The detection device 400 determines a region where the elastic wave generation source is positioned in the structure 10 on the basis of, for example, information acquired from the measurement device 200 via the information aggregation device 300. The detection device 400 will be described in detail below.

<2.2 Arrangement Example of AE Sensors>

Next, an arrangement example of the plurality of AE sensors 210 will be described. FIG. 6A is a cross-sectional view illustrating an arrangement example of four AE sensors 210A, 210B, 210C, and 210D (first to fourth AE sensors 210A, 210B, 210C, and 210D) included in the plurality of AE sensors 210. In the present embodiment, the four AE sensors 210A, 210B, 210C and 210D are separated and disposed on the first upright portion 31 and the second upright portion 32 of the U-rib 23. For example, the first and third AE sensors 210A and 210C are attached to a side surface of the first upright portion 31 of the U-rib 23 and detect elastic waves transferred to the first upright portion 31 of the U-rib 23. On the other hand, the second and fourth AE sensors 210B and 210D are attached to the side surface of the second upright portion 32 of the U-rib 23 and detect elastic waves transferred to the second upright portion 32 of the U-rib 23.

FIG. 6B is a plan view illustrating an arrangement example of the four AE sensors 210A, 210B, 210C, and 210D. For example, the four AE sensors 210A, 210B, 210C, and 210D are disposed to surround an inspection target region R set in the structure 10. For example, the positions of the first and second AE sensors 210A and 210B in the bridge axis direction (the positions thereof in the Y direction) are approximately the same as each other. The positions of the third and fourth AE sensors 210C and 210D in the bridge axis direction are approximately the same as each other. The pair of first and second AE sensors 210A and 210B and the pair of third and fourth AE sensors 210C and 210D are separately disposed so that they are separated on both sides of the inspection target region R in the bridge axis direction.

<2.3 Principle of Determining Region of Elastic Wave Generation Source>

Next, a principle of determining a region of an elastic wave generation source used in the detection system 100 of the present embodiment will be described. First, reflection behavior of elastic waves in the structure 10 will be described. According to research by the inventors of the present invention, it has been confirmed that a structure may have a reflection surface configured to reflect at least some of elastic waves. For example, there are first and second reflection surfaces 71 and 72 configured to reflect at least some of elastic waves in the structure 10 illustrated in FIG. 6A. The first reflection surface 71 is, for example, a boundary surface between the deck plate 21 and the paved portion 22 positioned near the end 32a of the second upright portion 32 of the U-rib 23. The second reflection surface 72 is, for example, a boundary surface between the deck plate 21 and the paved portion 22 positioned near the end 31a of the first upright portion 31 of the U-rib 23. However, the first and second reflection surfaces 71 and 72 are not limited to the above examples and may be other surfaces configured to reflect elastic waves.

Figure 7:
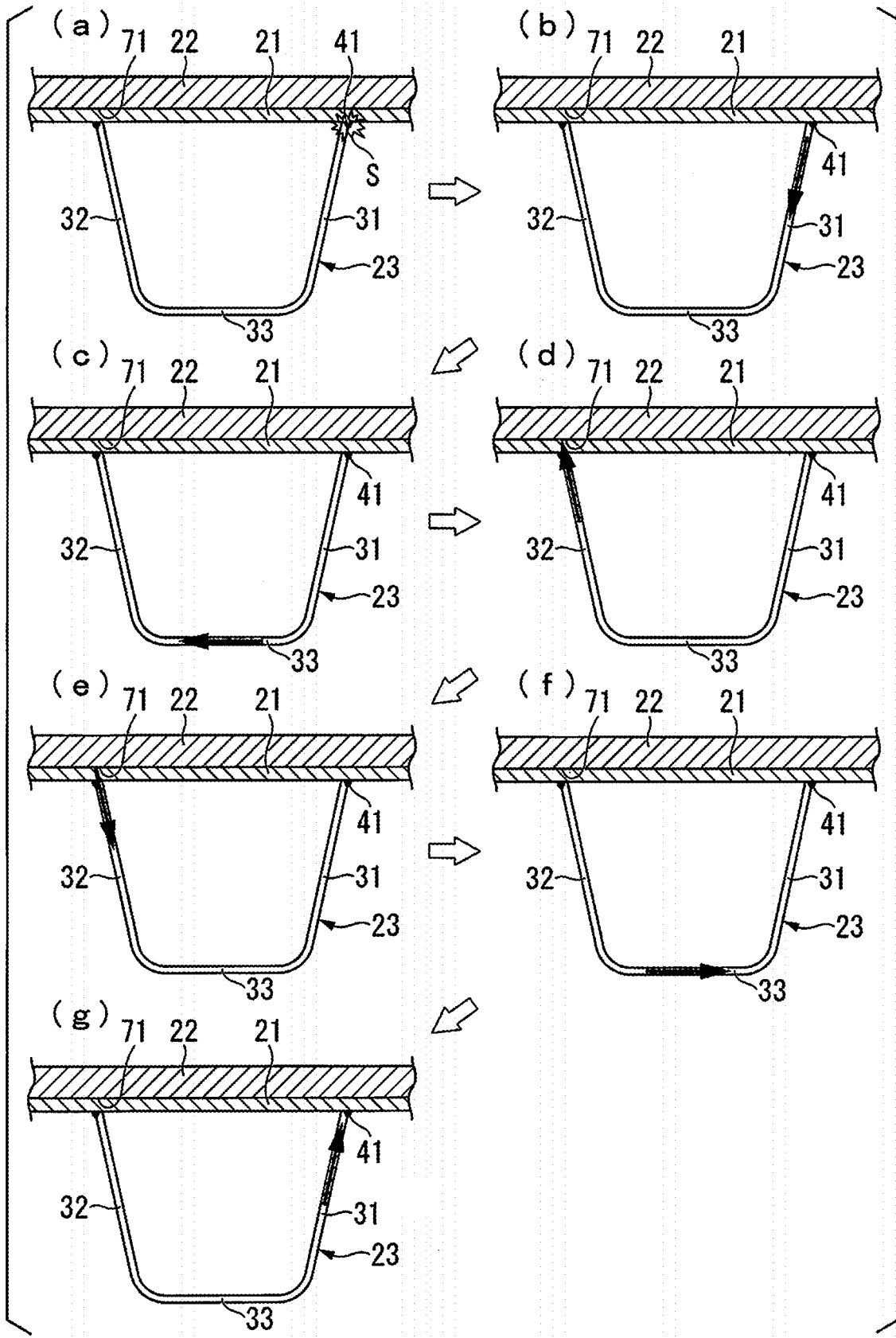
FIG. 7 is a cross-sectional view illustrating reflection behavior of elastic waves in a structure according to the first embodiment.

FIG. 7 is a cross-sectional view illustrating reflection behavior of the elastic waves in the structure 10. In FIG. 7, hatching for the U-rib 23 is omitted for convenience of description. FIG. 7 is an example in which elastic waves have been generated due to the occurrence of deformation or cracks C (development of cracks C) in the first welded portion 41 or a portion adjacent to the first welded portion 41 in the deck plate 21 (hereinafter, these will be collectively referred to as a "case in which elastic waves have been generated from the first welded portion 41"). Also, in this specification, a case in which "there is an elastic wave generation source S in the first welded portion 41" also includes a case in which there is an elastic wave generation source S in a portion adjacent to the first welded portion 41 in the deck plate 21.

In the example illustrated in FIG. 7, elastic waves emitted from the elastic wave generation source S pass through the first upright portion 31, the horizontal portion 33, and the second upright portion 32 of the U-rib 23 in this order and reach the first reflection surface 71 of the structure 10 ((a) to (d) in FIG. 7). At least some of the elastic waves reaching the first reflection surface 71 are reflected by the first reflection surface 71 and propagate through the second upright portion 32, the horizontal portion 33, and the first upright portion 31 of the U-rib 23 in this order ((e) to (g) in FIG. 7).

Also, behavior of elastic waves referred to as a case in which elastic waves have been generated due to the occurrence of deformation or cracks C (development of cracks C) in the second welded portion 42 or a portion adjacent to the second welded portion 42 in the deck plate 21 (hereinafter, these will be collectively referred to as a "case in which elastic waves have been generated from the second welded portion 42") is similar to that of the case in which elastic waves have been generated from the first welded portion 41, except that a progress direction of elastic waves is different and elastic waves are reflected on the second reflection surface 72. Also, in this specification, a case in which "there is an elastic wave generation source S in the second welded portion 42" includes a case in which there is an elastic wave generation source S in a portion adjacent to the second welded portion 42 in the deck plate 21.

Figure 8A:
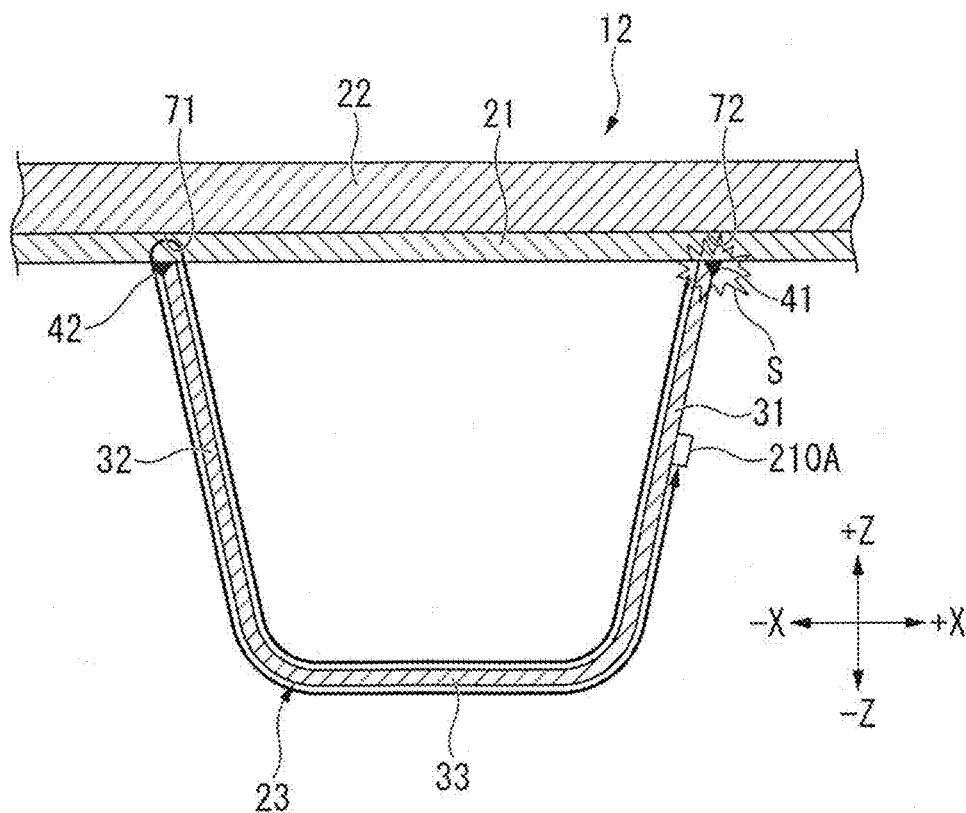
FIG. 8A is a cross-sectional view illustrating detection by a first AE sensor according to the first embodiment.

FIG. 8A is a cross-sectional view illustrating detection of elastic waves by the first AE sensor 210A (a first sensor). FIG. 8A is an example illustrating a "case in which elastic waves are generated from the first welded portion 41". The first AE sensor 210A detects direct waves of elastic waves transmitted to the first AE sensor 210A in a process in which the elastic waves are emitted from the elastic wave generation source S and pass through the first upright portion 31 of the U-rib 23. Also, the first AE sensor 210A detects reflected waves of the elastic waves emitted from the elastic wave generation source S, reaching the first reflection surface 71 through the first upright portion 31, the horizontal portion 33, and the second upright portion 32 of the U-rib 23, reflected on the first reflection surface 71, and re-transferred to the first AE sensor 210A through the second upright portion 32, the horizontal portion 33, and the first upright portion 31 of the U-rib 23

In the present specification, the term "direct waves" means elastic waves traveling directly from an elastic wave generation source to a portion of the structure to which the AE sensor is attached. The term "reflected waves" means elastic waves traveling toward the portion of the structure to which the AE sensor is attached after the elastic waves are emitted from the elastic wave generation source and reflected on a reflection surface included in the structure.

Figure 8B:
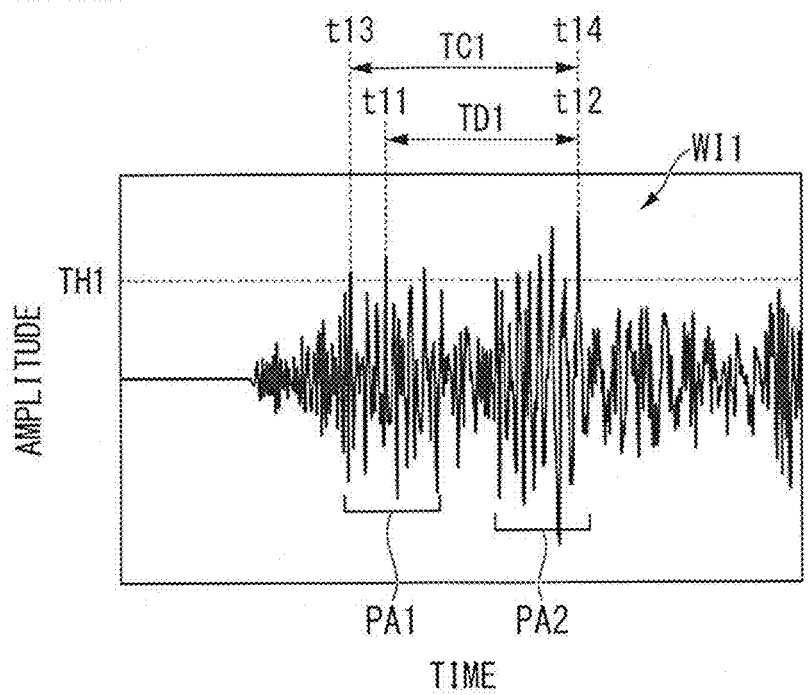
FIG. 8B is a diagram illustrating an example of a detection result of the first AE sensor according to the first embodiment.

FIG. 8B is a diagram illustrating an example of a detection result of the first AE sensor 210A. The detection result of the first AE sensor 210A includes, for example, first waveform information WI1 including a plurality of peak groups PA1 and PA2 (first and second peak groups PA1 and PA2) related to one elastic wave.

The first peak group PA1 is a detection result related to the direct waves. The first peak group PA1 is an example of information detected by the first AE sensor 210A before the elastic waves are reflected on the first reflection surface 71. On the other hand, the second peak group PA2 is a detection result related to the reflected waves. The second peak group PA2 is an example of information detected by the first AE sensor 210A after the elastic waves are reflected on the first reflection surface 71.

For example, it is possible to obtain first time difference information indicating a first time difference TD1 and first duration time information indicating a first duration time TC1 from such first waveform information WI1.

The first time difference TD1 is a time difference between a first time t11 corresponding to the first peak group PA1 and a second time t12 corresponding to the second peak group PA2. The "first time t11 corresponding to the first peak group PA1" is a representative value of measurement times at which the first peak group PA1 has been measured. The "second time t12 corresponding to the second peak group PA2" is a representative value of measurement times at which the second peak group PA2 has been measured. Also, a method of calculating the first time t11 and the second time t12 will be described below in detail.

The first duration time TC1 is a duration time until an output value of the first AE sensor 210A is attenuated to a first threshold value TH1 or less from a point in time at which the output value of the first AE sensor 210A has exceeded the first threshold value TH1 when viewed through the plurality of peak groups PA1 and PA2 (the first and second peak groups PA1 and PA2) included in the first waveform information WI1. In other words, the first duration time TC1 is an elapsed time from a time t13 that is a first point in time at which the output value of the AE sensor 210A included in the plurality of peak groups PA1 and PA2 has exceeded the first threshold value TH1 to a time t14 that is a last point in time at which the output value of the AE sensor 210A included in the plurality of peak groups PA1 and PA2 has exceeded the first threshold value TH1.

Figure 9A:
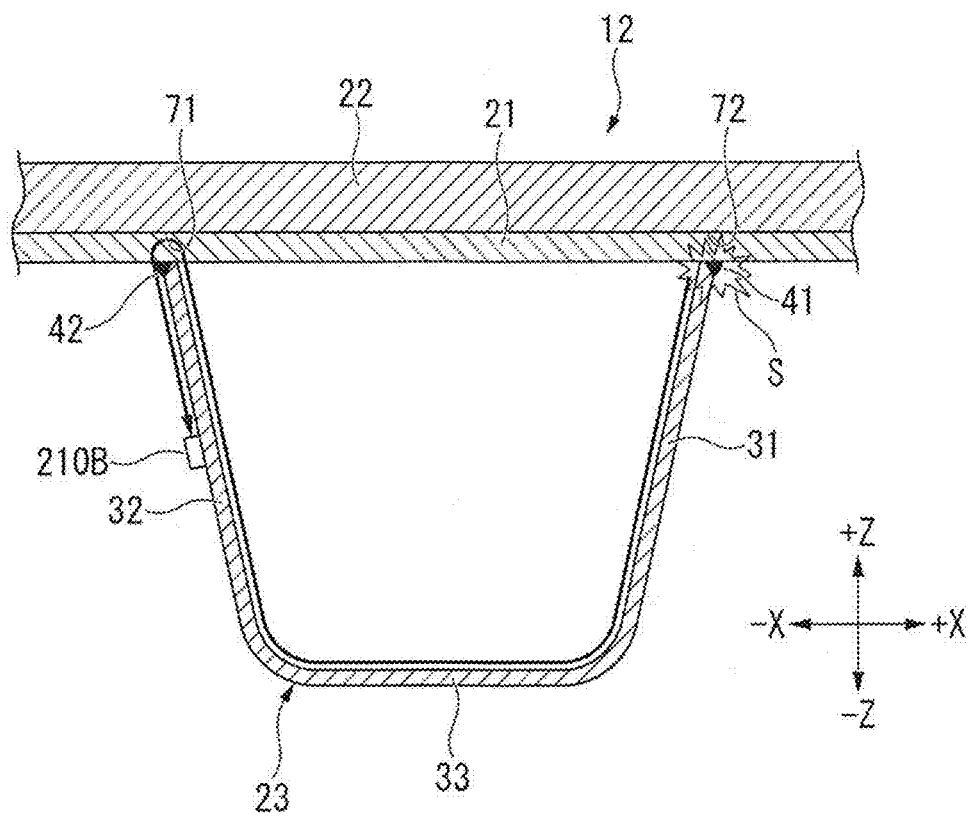
FIG. 9A is a cross-sectional view illustrating detection by a second AE sensor according to the first embodiment.

FIG. 9A is a cross-sectional view illustrating detection of elastic waves by the second AE sensor 210B (a second sensor). FIG. 9A is an example illustrating a "case in which elastic waves are generated from the first welded portion 41". The second AE sensor 210B detects direct waves of elastic waves transmitted to the second AE sensor 210B in a process in which the elastic waves are emitted from the elastic wave generation source S and pass through the second upright portion 32 of the U-rib 23 after passing through the first upright portion 31 and the horizontal portion 33 of the U-rib 23. Also, the second AE sensor 210B detects reflected waves of the elastic waves emitted from the elastic wave generation source S, reaching the first reflection surface 71 through the first upright portion 31, the horizontal portion 33, and the second upright portion 32 of the U-rib 23, reflected on the first reflection surface 71, and re-transferred to the second AE sensor 210B through the second upright portion 32 of the U-rib 23.

Figure 9B:
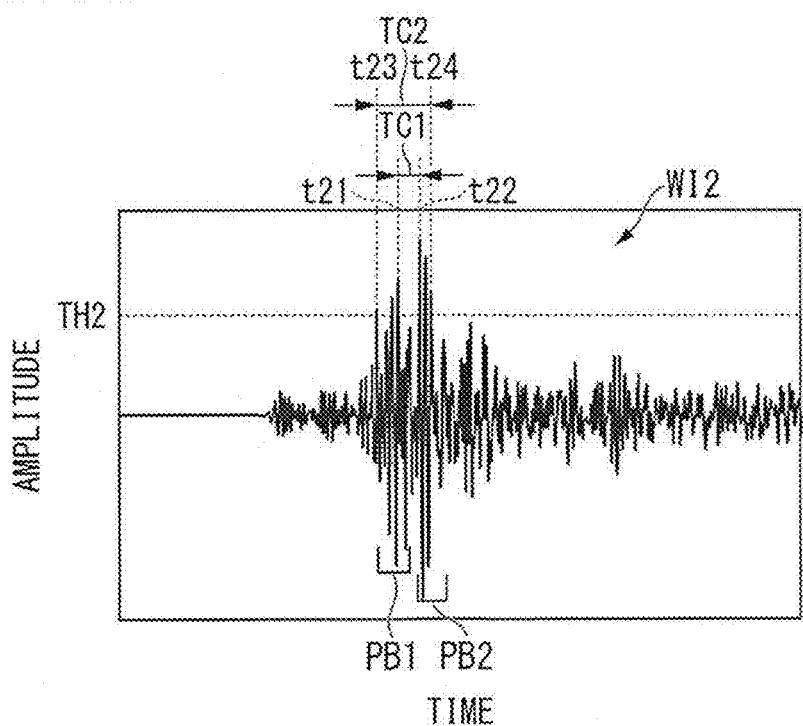
FIG. 9B is a diagram illustrating an example of a detection result of the second AE sensor according to the first embodiment.

FIG. 9B is a diagram illustrating an example of a detection result of the second AE sensor 210B. The detection result of the second AE sensor 210B includes, for example, second waveform information WI2 including a plurality of peak groups PB1 and PB2 (first and second peak groups PB1 and PB2) related to one elastic wave.

The first peak group PB1 is a detection result related to the above-described direct waves. The first peak group PB1 is an example of information detected by the second AE sensor 210B before elastic waves are reflected on the first reflection surface 71. On the other hand, the second peak group PB2 is a detection result related to the reflected waves. The second peak group PB2 is an example of information detected by the second AE sensor 210B after the elastic waves are reflected on the first reflection surface 71.

For example, second time difference information indicating a second time difference TD2 and second duration time information indicating second duration time TC2 can be obtained from such second waveform information WI2.

The second time difference TD2 is a time difference between a first time t21 corresponding to the first peak group PB1 and a second time t22 corresponding to the second peak group PB2. The "first time t21 corresponding to the first peak group PB1" is a representative value of measurement times at which the first peak group PB1 has been measured. The "second time t22 corresponding to the second peak group PB2" is a representative value of measurement times at which the second peak group PB2 has been measured. Also, a method of calculating the first time t21 and the second time t22 will be described below in detail.

The second duration time TC2 is a duration time until an output value of second AE sensor 210B is attenuated to a second threshold value TH2 or less from a point in time at which the output value of the second AE sensor 210B has exceeded the second threshold value TH2 when viewed through the plurality of peak groups PB1 and PB2 (the first and second peak groups PB1 and PB2) included in the second waveform information WI2. In other words, the second duration time TC2 is an elapsed time from a time t23 that is a first point in time at which the output value of the AE sensor 210B included in the plurality of peak groups PB1 and PB2 has exceeded the second threshold value TH2 to a time t24 that is a last point in time at which the output value of the AE sensor 210B included in the plurality of peak groups PB1 and PB2 has exceeded the second threshold value TH2. Although the second threshold value TH2 is, for example, approximately the same value as the first threshold value TH1, the second threshold value TH2 may be different from the first threshold value TH1.

Here, in the present embodiment, the first AE sensor 210A is disposed so that the first AE sensor 210A is closer to the second reflection surface 72 than the second AE sensor 210B. On the other hand, the second AE sensor 210B is disposed so that the second AE sensor 210B is closer to the first reflection surface 71 than the first AE sensor 210A. Thus, when the elastic waves are reflected on the first reflection surface 71 (or the second reflection surface 72) and the direct waves and the reflected waves of the elastic wave are input to the first and second AE sensors 210A and 210B, input timings of the direct waves for the first and second AE sensors 210A and 210B are different from each other and input timings of the reflected waves for the first and second AE sensors 210A and 210B are different from each other.

For example, when the "elastic waves are generated from the first welded portion 41", an input of the direct waves to the first AE sensor 210A is earlier than an input of the direct waves to the second AE sensor 210B. An input of the reflected waves to the first AE sensor 210A is later than an input of the reflected waves to the second AE sensor 210B. As a result, the first time difference TD1 is longer than the second time difference TD2. Also, the first duration time TC1 is longer than the second duration time TC2.

On the other hand, when the "elastic waves are generated from the second welded portion 42", an input of the direct waves to the first AE sensor 210A is later than an input of the direct waves to the second AE sensor 210B. An input of the reflected waves to the first AE sensor 210A is earlier than an input of the reflected waves to the second AE sensor 210B. As a result, the first time difference TD1 is shorter than the second time difference TD2. Also, the first duration time TC1 is shorter than the second duration time TC2.

Also, here, there may be a case in which direct waves emitted from the elastic wave generation source and detected by the AE sensor 210 move to the reflection surface as they are and are re-detected by the AE sensor 210 as reflected waves after being reflected on the reflection surface. However, the "reflected waves" used in the present specification are not limited to the reflected waves as described above. The "reflected waves" used in the present specification will be additionally described below.

Figure 10:
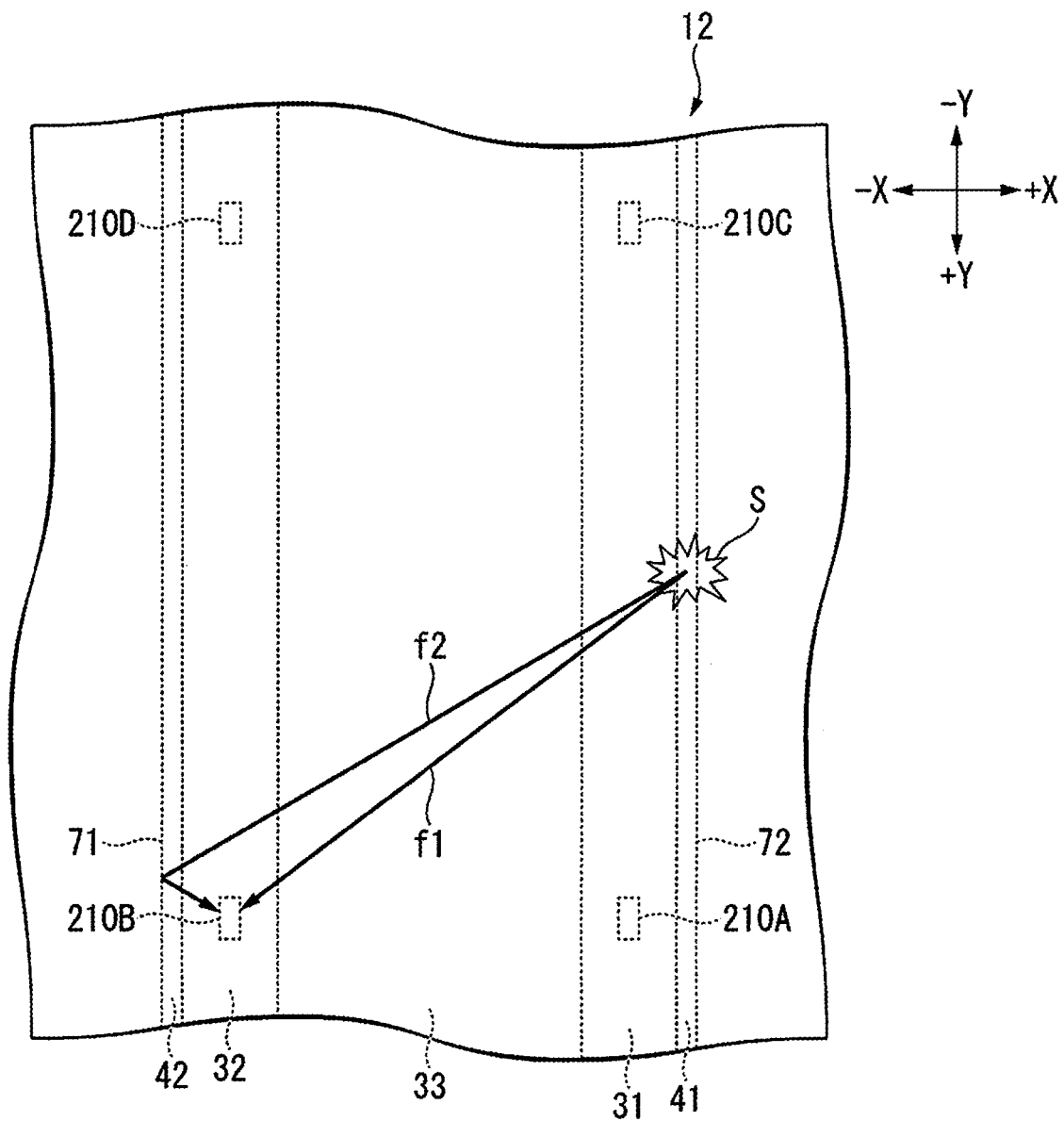
FIG. 10 is a plan view illustrating reflection behavior of elastic waves according to the first embodiment.

FIG. 10 is a plan view additionally illustrating reflection behavior of the elastic waves. In FIG. 10, an input of the elastic waves to the second AE sensor 210B is representatively illustrated. In this example, in the elastic wave generation source S, a position in the bridge axis direction (the Y direction) is different with respect to the second AE sensor 210B. In this case, the direct waves and the reflected waves described above reach the second AE sensor 210B through mutually different paths f1 and f2 in the structure 10. That is, the elastic waves are radially emitted from the generation source S. Among radially extended elastic waves, elastic waves traveling along the first path f1 directly directed from the generation source S to the second AE sensor 210B correspond to "direct waves". On the other hand, elastic waves moving to the second path f2 different from the first path f1 among the radially extended elastic waves and moving to the second AE sensor 210B after being reflected by the first reflection surface 71 correspond to "reflected waves".

Also, for a similar reason, direct waves input to the first AE sensor 210A and direct waves input to the second AE sensor 210B can be direct waves traveling along different paths instead of direct waves traveling along the same path. Also, reflected waves input to the first AE sensor 210A and reflected waves input to the second AE sensor 210B can be reflected waves traveling along different paths instead of reflected waves traveling along the same path. Even when the direct waves and the reflected waves input to the two AE sensors 210A and 210B have such a relationship, the waveform information WI1 and WI2 are obtained as described with reference to FIGS. 8B and 9B.

Inputs of elastic waves to the first and second AE sensors 210A and 210B have been described above. Inputs of elastic waves to the third and fourth AE sensors 210C and 210D are also similar to those of the above description related to the first and second AE sensors 210A and 210B.

<2.4 Detection Device>

Next, the detection device 400 will be described in detail. In the present embodiment, the detection device 400 roughly determines a region of the elastic wave generation source S on the basis of detection results of the plurality of AE sensors 210, and locates a position of the elastic wave generation source S on the basis of a determination result. First, a rough determination of a region of the elastic wave generation source S based on the detection results of the first and second AE sensors 210A and 210B will be described. Also, the detection device 400 may make a region determination to be described below using detection results of the third and fourth AE sensors 210C and 210D instead of the detection results of the first and second AE sensors 210A and 210B.

Figure 11:
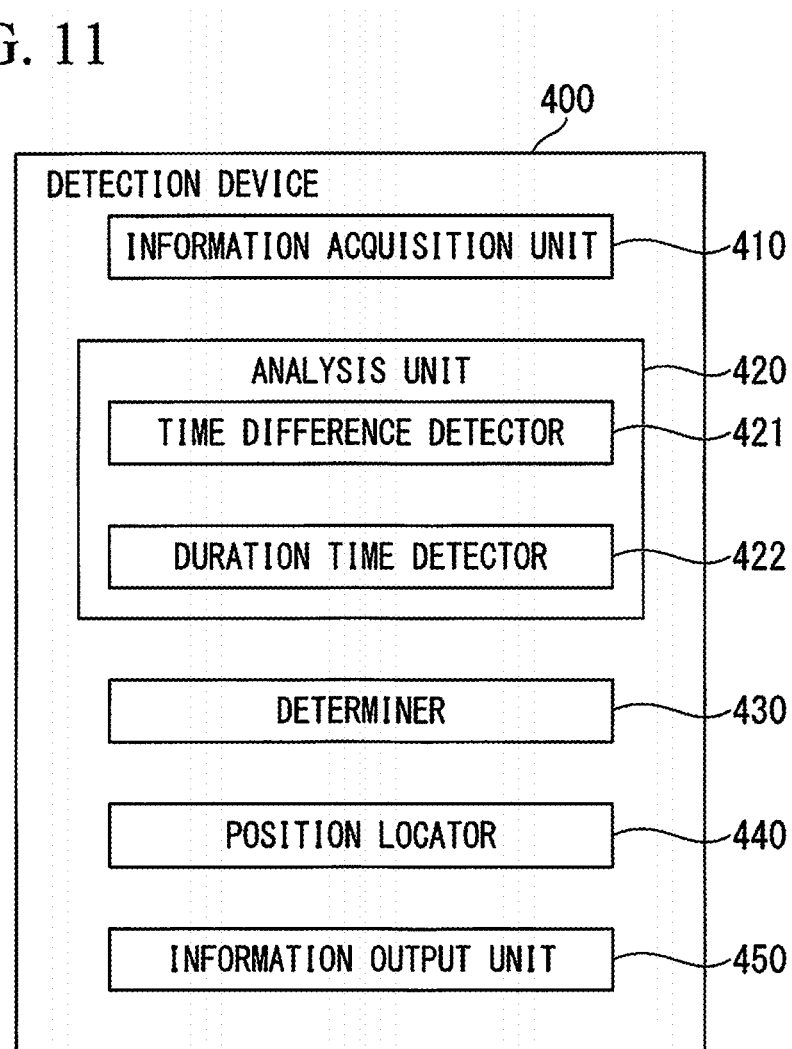
FIG. 11 is a block diagram illustrating a system configuration of a detection device according to the first embodiment.

FIG. 11 is a block diagram illustrating a system configuration of the detection device 400. The detection device 400 includes, for example, an information acquisition unit 410, an analysis unit 420, a determiner 430, a position locator 440, and an information output unit 450. For example, at least some of the information acquisition unit 410, the analysis unit 420, the determiner 430, the position locator 440, and the information output unit 450 are implemented by hardware processors such as a central processing unit (CPU) or a graphics processing unit (GPU) executing a program (software) stored in a storage unit (not illustrated). Also, some or all of these components may be implemented by hardware (including a circuit unit; circuitry) such as LSI, an ASIC, and an FPGA or may be implemented by cooperation of software and hardware.

The information acquisition unit 410 acquires a detection result (for example, time-series data) of the AE sensor 210 from the measurement device 200 via the information aggregation device 300. For example, the information acquisition unit 410 acquires detection results of the four AE sensors 210A, 210B, 210C, and 210D. Thereby, the information acquisition unit 410 acquires waveform information of the output value of each AE sensor 210 (for example, the first and second waveform information WI1 and WI2). The information acquisition unit 410 outputs the acquired information to the analysis unit 420 and the position locator 440.

The analysis unit 420 analyzes the information received from the information acquisition unit 410 and obtains various information. The analysis unit 420 includes, for example, a time difference detector 421 and a duration time detector 422.

The time difference detector 421 detects the first time difference TD1 on the basis of the first waveform information WI1.

As described above, the first time difference TD1 is a time difference between the first time t11 corresponding to the first peak group PA1 and the second time t12 corresponding to the second peak group PA2 included in the first waveform information WI1. Also, the time difference detector 421 detects the second time difference TD2 on the basis of the second waveform information WI2. As described above, the second time difference TD2 is a time difference between the first time t21 corresponding to the first peak group PB1 and the second time t22 corresponding to the second peak group PB2 included in the second waveform information WI2.

Here, three techniques for calculating the first time difference TD1 and the second time difference TD2 will be exemplified. These three techniques are (i) detection by envelope curve, (ii) detection by peak extraction, and (iii) detection using frequency characteristics. However, the first time difference TD1 and the second time difference TD2 may be obtained in techniques different therefrom.

(i) Detection by Envelope Curve

Figure 12A:
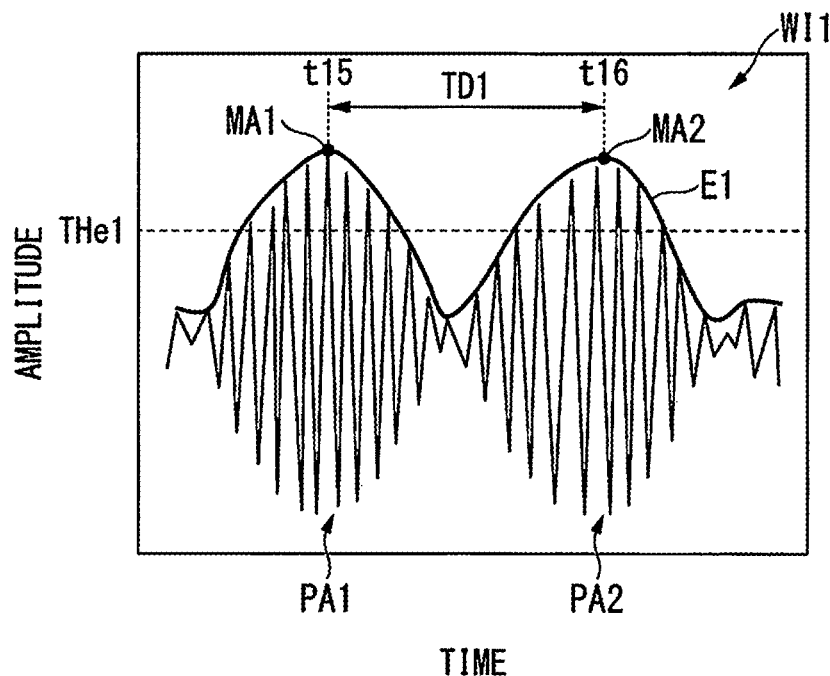
FIG. 12A is a diagram illustrating a first example of a process of detecting a first time difference in the first embodiment.

FIG. 12A is a diagram illustrating a process of detecting the first time difference TD1 using an envelope curve. The time difference detector 421 extracts an envelope curve E1 smoothly following a plurality of peaks of the waveform (the output value of the first AE sensor 210A) included in the first waveform information WI1. The envelope curve E1 is extracted, for example, by squaring the output value of the first AE sensor 210A and performing a predetermined process (for example, a process using a low-pass filter or a Hilbert transform) on the squared output value. For example, the time difference detector 421 may adjust parameters of the above-described predetermined process so that two peaks exceeding a preset threshold value THe1 can be formed.

Then, the time difference detector 421 acquires a maximum value (a maximum value of a first peak) MA1 of a first region exceeding the threshold value THe1 and a maximum value (a maximum value of a second peak) MA2 of a second region exceeding the threshold value THe1 in the envelope curve E1 obtained as described above. The time difference detector 421 detects a time difference between a first time t15 corresponding to the maximum value MA1 of the first region and a second time t16 corresponding to the maximum value MA2 of the second region as the first time difference TD1.

Figure 12B:
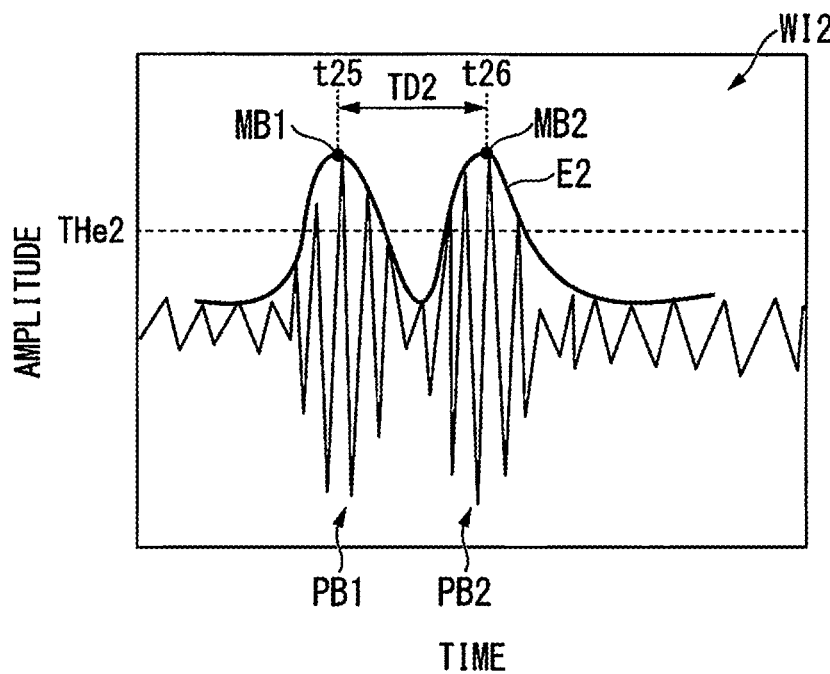
FIG. 12B is a diagram illustrating a first example of a process of detecting a second time difference in the first embodiment.

Likewise, FIG. 12B is a diagram illustrating a process of detecting the second time difference TD2 using the envelope curve.

As in the example in which the first time difference TD1 is obtained, the time difference detector 421 extracts an envelope curve E2 smoothly following a plurality of peaks of the waveform (the output value of the second AE sensor 210B) included in the second waveform information WI2. The time difference detector 421 may adjust parameters for extracting the envelope curve E2 so that two peaks exceeding a preset threshold value THe2 can be generated.

Then, the time difference detector 421 acquires a maximum value (a maximum value of a first peak) MB1 of a first region exceeding the threshold value THe2 and a maximum value (a maximum value of a second peak) MB2 of a second region exceeding the threshold value THe2 in the envelope curve E2 obtained as described above. The time difference detector 421 detects a time difference between a first time t25 corresponding to the maximum value MB1 of the first region and a second time t26 corresponding to the maximum value MB2 of the second region as the second time difference TD2.

(ii) Detection by Peak Extraction

Figure 13:
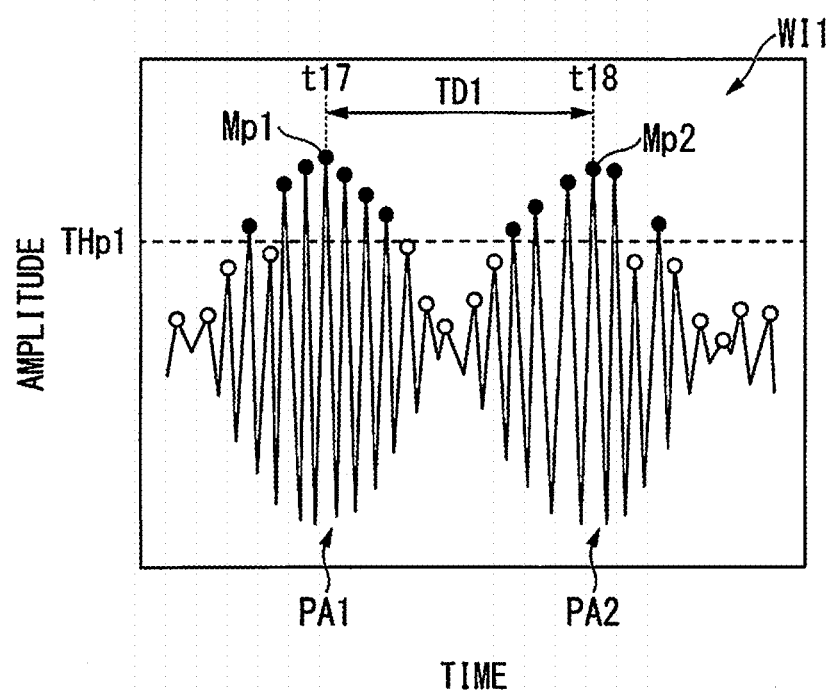
FIG. 13 is a diagram illustrating a second example of the process of detecting the first time difference in the first embodiment.

FIG. 13 is a diagram illustrating a process of detecting the first time difference TD1 using peak extraction. The time difference detector 421 sets a threshold value THp1 for extracting the two peak groups PA1 and PA2 from the waveform included in the first waveform information WI1. That is, the threshold value THp1 is set so that the output value of the AE sensor 210A is less than the threshold value THp1 for a fixed time between the two peak groups PA1 and PA2. Thereby, the time difference detector 421 can divide the waveform included in the first waveform information WI1 into the two peak groups PA1 and PA2.

Then, the time difference detector 421 detects a maximum peak Mp1 included in the first peak group PA1 and a maximum peak Mp2 included in the second peak group PA2. The time difference detector 421 detects a time difference between a first time t17 corresponding to the maximum peak Mp1 included in the first peak group PA1 and a second time t18 corresponding to the maximum peak Mp2 included in the second peak group PA2 as the first time difference TD1. The time difference detector 421 detects the second time difference TD2 by performing a process similar to the above-described process on the second waveform information WI2.

(iii) Detection Using Frequency Characteristics

Figure 14:
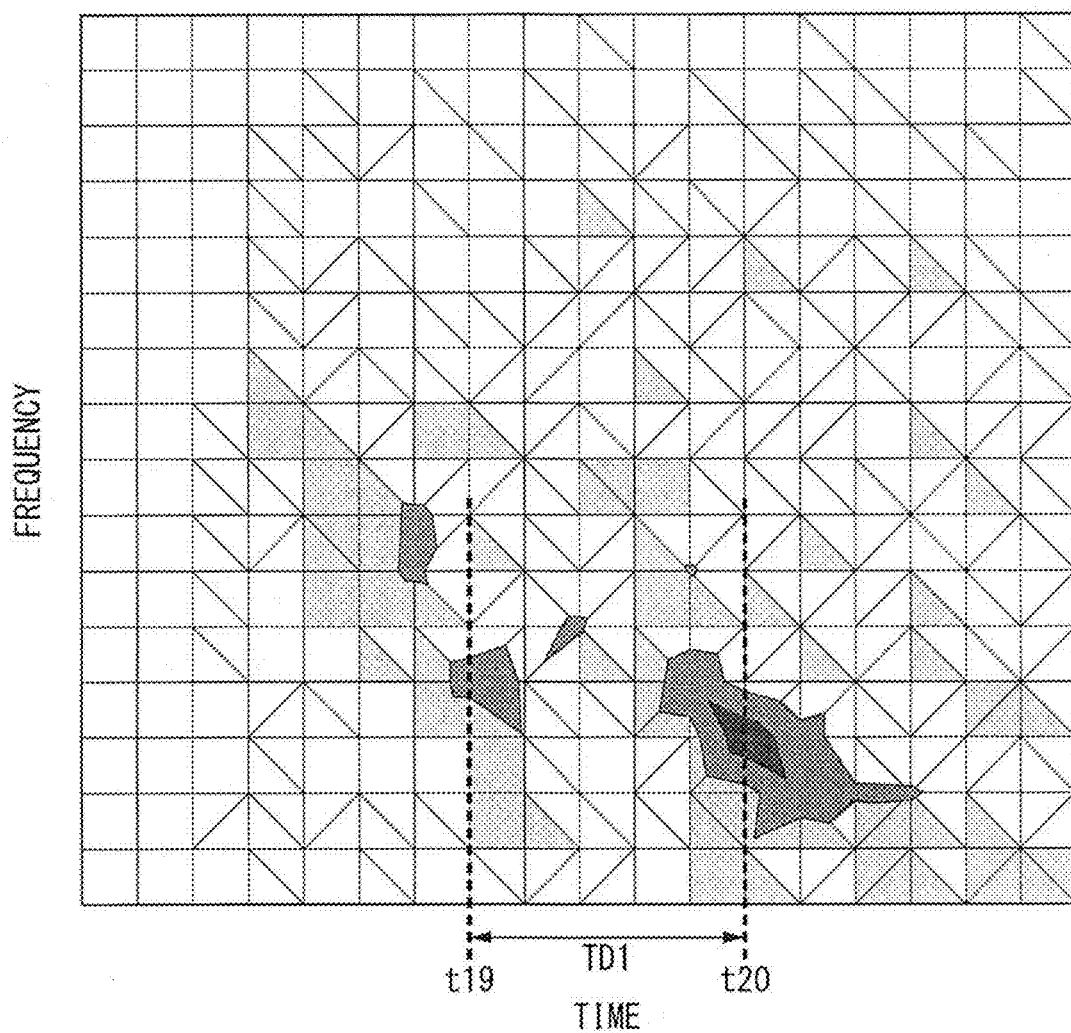
FIG. 14 is a diagram illustrating a third example of the process of detecting the first time difference in the first embodiment.

FIG. 14 is a diagram illustrating a process of detecting the first time difference TD1 from the frequency characteristics (time frequency analysis) at each time. The time difference detector 421 generates information as illustrated in FIG. 14 by dividing the first waveform information WI1 every fixed time (for example, 50 μsec) and performing a Fourier transforms on each waveform after division. FIG. 14 illustrates that the output value of the AE sensor 210 is larger when a color is darker in a region. For example, FIG. 14 illustrates an example in which a short-time Fourier transform is used. Also, the time difference detector 421 may generate similar information using a wavelet transform instead of the short-time Fourier transform.

According to such a process, the first waveform information WI1 can be divided into a first peak group PA1 and a second peak group PA2. The time difference detector 421 detects a time difference between a first time t19 corresponding to a maximum value of the first peak group PA1 after the Fourier transform and a second time t20 corresponding to a maximum value of the second peak group PA2 after the Fourier transform as the first time difference TD1. Also, when there are a plurality of peak groups, the first time difference TD1 is detected by comparing peak groups whose frequencies are close to each other. The time difference detector 421 detects the second time difference TD2 by also performing a process similar to the above-described process on the second waveform information WI2.

Also, in the above description of (i) to (iii), an example in which the time differences TD1 and TD2 are detected using positive output values among output values included in the waveform information is shown. Alternatively, negative output values included in the waveform information may be used to detect the time differences TD1 and TD2.

Next, the duration time detector 422 will be described. The duration time detector 422 detects the first duration time TC1 on the basis of the first waveform information WI1 (see FIG. 8B). As described above, when viewed through the first and second peak groups PA1 and PA2 included in the first waveform information WI1, the first duration time TC1 is a duration time until the output value of the first AE sensor 210A is attenuated to the first threshold value TH1 or less from a point in time at which the output value of the first AE sensor 210A has exceeded the first threshold value TH1. For example, the duration time detector 422 detects the first duration time TC1 using a preset first threshold value TH1. The duration time detector 422 detects the second duration time TC2 by performing a process similar to the above-described process on the second waveform information WI2.

The analysis unit 420 outputs first time difference information indicating the first time difference TD1, first duration time information indicating the first duration time TC1, second time difference information indicating the second time difference TD2, and second duration time information indicating the second duration time TC2 obtained by the above-described analysis to the determiner 430.

Next, the determiner 430 will be described. The determiner 430 roughly determines a region where the elastic wave generation source S is positioned in the structure 10 on the basis of the first and second waveform information WI1 and WI2. For example, the determiner 430 determines whether the elastic wave generation source S is close to either the first reflection surface 71 or the second reflection surface 72 on the basis of the first and second waveform information WI1 and WI2. For example, the determiner 430 determines whether the elastic wave generation source S is positioned in the vicinity of the first reflection surface 71 or in the vicinity of the second reflection surface 72. In the present embodiment, the determiner 430 determines whether the elastic wave generation source S is present in the first welded portion 41 or in the second welded portion 42.

In the present embodiment, the determiner 430 makes the above-described determination on the basis of information about the plurality of peak groups PA1 and PA2 included in the first waveform information WI1 and information about the plurality of second peak groups PB1 and PB2 included in the second waveform information WI2. For example, the determiner 430 makes the above-described determination on the basis of first information characterized by the plurality of peak groups PA1 and PA2 included in the first waveform information WI1 and second information characterized by the plurality of peak groups PB1 and PB2 included in the second waveform information WI2.

Each of the first time difference TD1 and the first duration time TC1 is an example of the "first information characterized by the plurality of peak groups PA1 and PA2 included in the first waveform information WI1". Each of the second time difference TD2 and the second duration time TC2 is an example of the "second information characterized by the plurality of peak groups FBI and PB2 included in the second waveform information WI2". However, the "information characterized by the plurality of peak groups" is not limited to the above example. Details of the "information characterized by the plurality of peak groups" are not particularly limited as long as a change appears in the information when a distance between the elastic wave generation source S and the AE sensor 210 changes.

In the present embodiment, the determiner 430 makes the above-described determination on the basis of at least one of the first time difference TD1 and the first duration time TC1 and at least one of the second time difference TD2 and the second duration time TC2. For example, the determiner 430 compares the first time difference TD1 with the second time difference TD2 and determines that the elastic wave generation source S is present in the first welded portion 41 when the first time difference TD1 is greater than the second time difference TD2 (that is, in the case of FIGS. 8B and 9B). On the other hand, when the second time difference TD2 is greater than the first time difference TD1, the determiner 430 determines that the elastic wave generation source S is present in the second welded portion 42.

Also, the determiner 430 may make the determination based on the first and second duration times TC1 and TC2 instead of or in addition to the determination based on the first and second time differences TD1 and TD2. For example, the determiner 430 compares the first duration time TC1 with the second duration time TC2 and determines that the elastic wave generation source S is present in the first welded portion 41 when the first duration time TC1 is longer than the second duration time TC2. On the other hand, when the second duration time TC2 is longer than the first duration time TC1, the determiner 430 determines that the elastic wave generation source S is present in the second welded portion 42.

The determiner 430 outputs the above-described determination result to the position locator 440.

The position locator 440 locates the position of the electric wave generation source S on the basis of output results (for example, time-series data) of the plurality of AE sensors 210 received from the information acquisition unit 410 and a determination result related to the position of the elastic wave generation source S in the determiner 430.

In the present embodiment, the position locator 440 locates the position of the elastic wave generation source S on the basis of detection results of two AE sensors 210 of a set closer to the elastic wave generation source S (i.e., a set for which an arrival time of elastic waves is earlier) between the set of the first and third AE sensors 210A and 210C and the set of the second and fourth AE sensors 210B and 210D. For example, when the determiner 430 determines that the elastic wave generation source S is present in the first welded portion 41, the position locator 440 locates the position of the elastic wave generation source S on the basis of detection results of the first and third AE sensors 210A and 210C. On the other hand, when the determiner 430 determines that the elastic wave generation source S is present in the second welded portion 42, the position locator 440 locates the position of the elastic wave generation source S on the basis of detection results of the second and fourth AE sensors 210B and 210D.

Next, a process of locating a position of the elastic wave generation source S in the position locator 440 will be described.

The position locator 440 detects an arrival time of elastic waves for each AE sensor 210 on the basis of output results (for example, time-series data) of the plurality of AE sensors 210 received from the information acquisition unit 410. For example, when the output value of each AE sensor 210 increases beyond a preset threshold value, the position locator 440 sets time information at the time of occurrence of the increase as the arrival time of the elastic waves.

Figure 15:
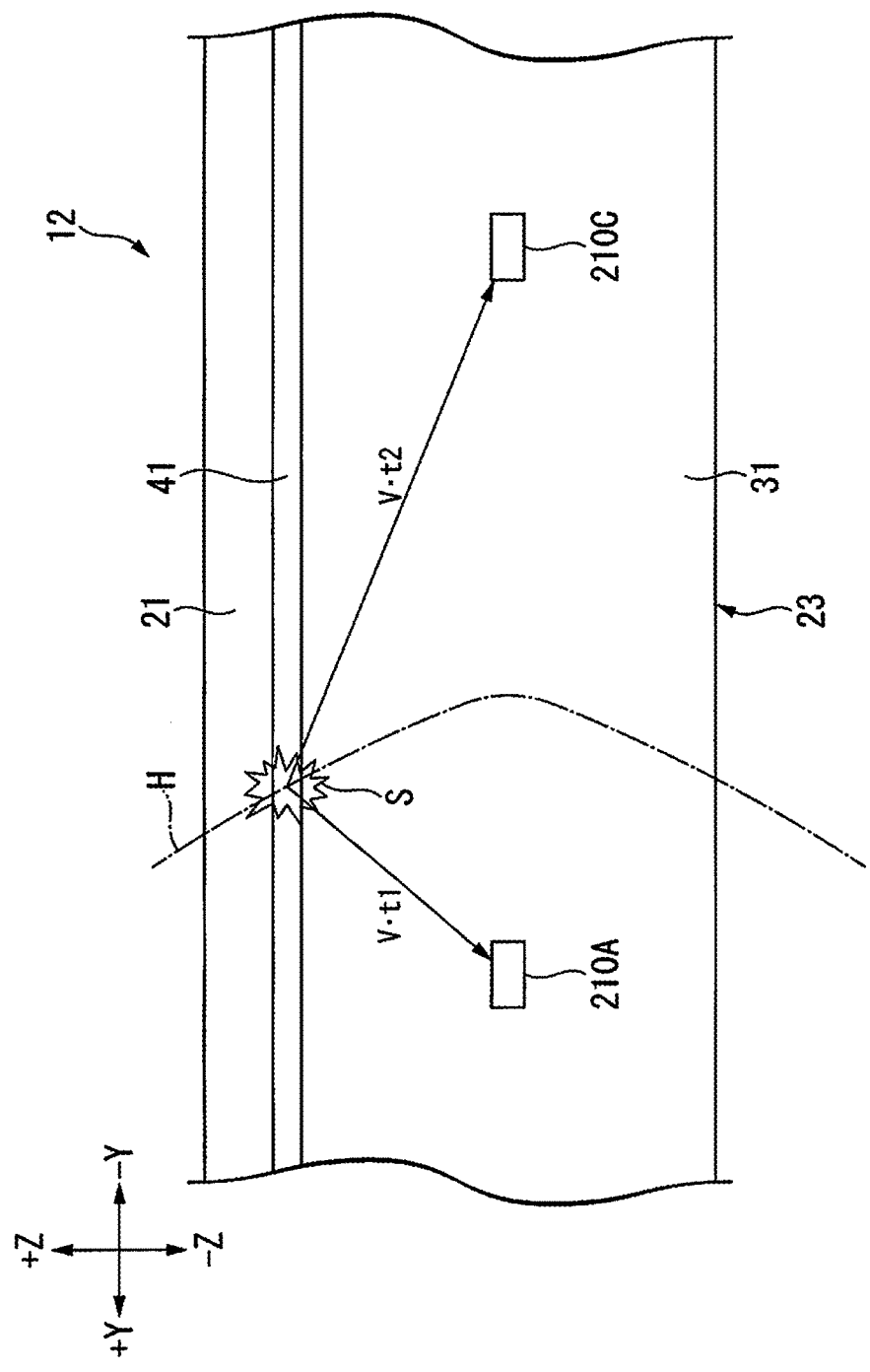
FIG. 15 is a side view illustrating a position locating process of a position locator according to the first embodiment.

FIG. 15 is a side view illustrating a position locating process of the position locator 440. FIG. 15 illustrates an example in which the determiner 430 determines that the elastic wave generation source S is present in the first welded portion 41 and the position of the elastic wave generation source S is located on the basis of detection results of the first and third AE sensors 210A and 210C. The position locator 440 locates the position of the elastic wave generation source S in the first welded portion 41 on the basis of positions of the first welded portion 41 in X and Z directions stored in the storage unit (not illustrated), a time difference between an arrival time of elastic waves (for example, an arrival time of direct waves) for the first AE sensor 210A and an arrival time of elastic waves (for example, an arrival time of direct waves) for the third AE sensor 210C, and a propagation speed of elastic waves in the U-rib 23.

For example, a hyperbolic curve H illustrated in FIG. 15 is a line having a constant value of $v \cdot \Delta t$ when an arrival time of elastic waves for the first AE sensor 210A is denoted by t1, an arrival time of elastic waves for the third AE sensor 210C is denoted by t2, a time difference between U and t2 is denoted by $\Delta t$, and a propagation speed of elastic waves in the U-rib 23 is denoted by v. The position locator 440 locates the position of the elastic wave generation source S in the first welded portion 41 by obtaining a position of an intersection between the hyperbolic curve H and the first welded portion 41. The position locator 440 outputs information indicating the located position of the generated elastic wave generation source S to the information output unit 450.

The information output unit 450 converts the information indicating the position of the elastic wave generation source S located by the position locator 440 into information to be output to a user interface (U1). The information output unit 450 outputs the converted information to the user interface. The user interface is, for example, a display device capable of displaying various types of information.

Next, an example of a flow of a detection method of the detection system 100 will be described. In the following description, the determiner 430 makes a determination based on the first and second time differences TD1 and TD2. When the determiner 430 makes the above-described determination according to the first and second duration times TC1 and TC2, it is only necessary to replace the "first time difference TD1" with the "first duration time TC1" and replace the "second time difference TD2" with the "second duration time TC2" in the following description.

Figure 16:
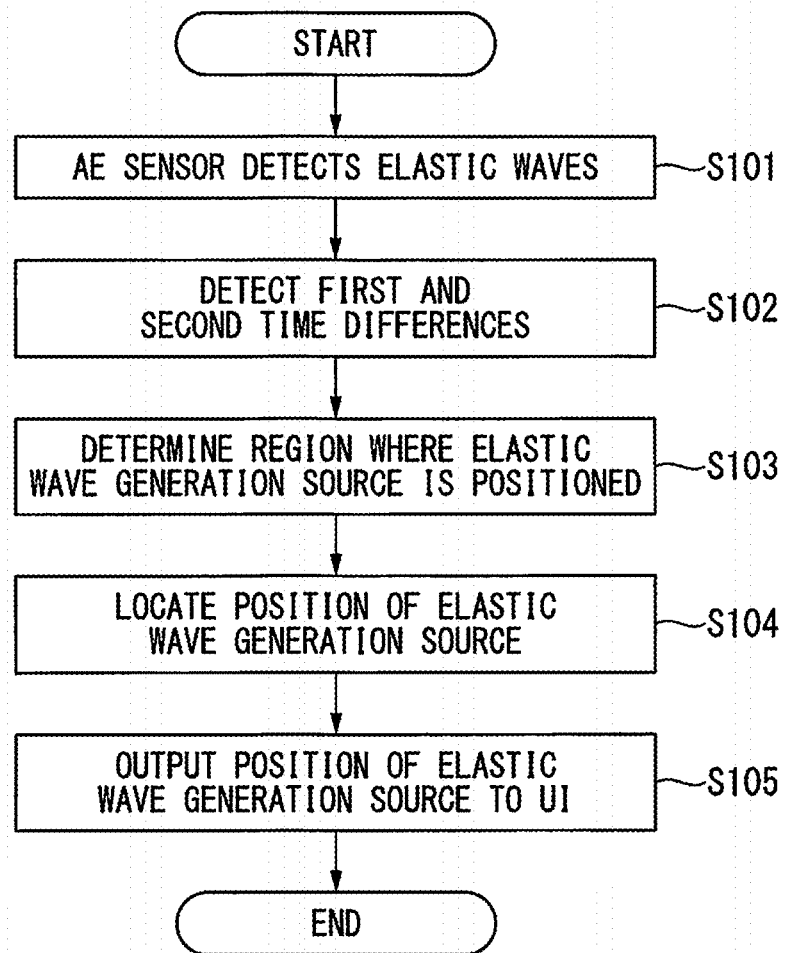
FIG. 16 is a flowchart illustrating an example of a flow of a detection method of the detection system of the first embodiment.

FIG. 16 is a flowchart showing an example of a flow of a detection method of the detection system 100. First, a plurality of AE sensors 210 detect elastic waves (step S101). For example, the detection device 400 receives detection results of the plurality of AE sensors 210 from the measurement device 200 via the information aggregation device 300.

Next, the time difference detector 421 detects the first and second time differences TD1 and TD2 on the basis of the first and second waveform information WI1 and WI2 (step S102). Next, the determiner 430 determines whether the elastic wave generation source S is present in the first welded portion 41 or the second welded portion 42 on the basis of the first and second time differences TD1 and TD2 detected by the time difference detector 421 (step S103).

Next, the position locator 440 locates a position of the elastic wave generation source S on the basis of a determination result of the determiner 430, a time difference between arrival times of elastic waves for the plurality of AE sensors 210, and the like (S104). The position locator 440 outputs the located elastic wave generation source S to the information output unit 450. Thereafter, the information output unit 450 outputs information indicating the position of the elastic wave generation source S located by the position locator 440 to the user interface (S105). Thereby, a series of processes is completed.

According to the detection system 100 configured as described above, it is possible to improve accuracy in determining a deterioration position. In other words, when the sensitivity of the AE sensor 210 is good, elastic waves generated at a relatively far position may also be detected with relatively high sensitivity. In this case, if there are a plurality of candidate regions in which elastic waves are generated in the structure 10, a candidate region where elastic waves have occurred may not be known. For example, in the structure 10 illustrated in FIG. 3, it may not be known whether elastic waves have been generated in the first welded portion 41 or whether elastic waves have been generated in the second welded portion 42.

Therefore, in the present embodiment, the detection system 100 has the determiner 430 configured to determine a region where the elastic wave generation source S is positioned on the basis of the first waveform information WI1 when the first waveform information WI1 including a plurality of peak groups PA1 and PA2 related to one elastic wave is included in the detection result of the first AE sensor 210A. According to such a configuration, for example, it is possible to determine whether the elastic wave generation source S is close to or far from the reflection surface included in the structure 10 on the basis of the first waveform information WI. Thereby, it is possible to narrow down the region where the elastic wave generation source S is positioned. Thereby, it is possible to improve accuracy in determining the deterioration position.

In the present embodiment, the determiner 430 determines a region wherein the elastic wave generation source is positioned on the basis of the first time difference TD1 between the first time t11 corresponding to the first peak group PA1 and the second time t12 corresponding to the second peak group PA2. According to such a configuration, it is possible to more accurately determine the region where the elastic wave generation source S is positioned using the time difference between the direct waves and the reflected waves. Thereby, it is possible to further improve accuracy in determining the deterioration position.

In the present embodiment, the determiner 430 determines a region wherein the elastic wave generation source S is positioned on the basis of the first duration time TC1 until an output value of the first AE sensor 210A is attenuated to a first threshold value TH1 or less from a point in time at which the output value of the first AE sensor 210A has exceeded the first threshold value TH1 when viewed through the plurality of peak groups PA1 and PA2. According to such a configuration, it is possible to more accurately determine a region where the elastic wave generation source S is positioned using an elapsed time from the time of direct waves to the time of reflected waves. Thereby, it is possible to further improve accuracy in determining the deterioration position.

In the present embodiment, the determiner 430 determines a region wherein the elastic wave generation source S is positioned on the basis of the first information characterized by the plurality of peak groups PA1 and PA2 of the first waveform information WI1 and the second information characterized by the plurality of peak groups PB1 and PB2 of the second waveform information WI2. According to such a configuration, it is possible to more accurately determine the region where the elastic wave generation source S is positioned on the basis of waveform information of the two AE sensors 210A and 210B. Thereby, it is possible to further improve accuracy in determining the deterioration position.

In the present embodiment, the determiner 430 determines a region wherein the elastic wave generation source S is positioned on the basis of the first time difference TD1 obtained from the first waveform information WI1 and the second time difference TD2 obtained from the second waveform information WI2. According to such a configuration, it is possible to more accurately determine the region where the elastic wave generation source S is positioned on the basis of a magnitude relationship of a time difference between the direct waves and the reflected waves in the two AE sensors 210A and 210B. Thereby, it is possible to further improve accuracy in determining the deterioration position.

In the present embodiment, the determiner 430 determines a region wherein the elastic wave generation source S is positioned on the basis of the first duration time TC1 obtained from the first waveform information WI1 and the second duration time TC2 obtained from the second waveform information WI2. According to such a configuration, it is possible to more accurately determine the region where the elastic wave generation source S is positioned on the basis of a magnitude relationship between elapsed times from the time of the direct waves to the time of the reflected waves in the two AE sensors 210A and 210B. Thereby, it is possible to further improve accuracy in determining the deterioration position.

In the present embodiment, the determiner 430 locates a position of the elastic wave generation source on the basis of a detection result of the AE sensor 210 for which an arrival time of the elastic waves is earlier between the first AE sensor 210A and the second AE sensor 210B. According to such a configuration, it is possible to minimize an influence of mixing of elastic waves propagating from the deck plate 21, attenuation of elastic waves in the U-rib 23, and the like. Thereby, it is possible to further improve accuracy in determining the deterioration position.

Second Embodiment

Next, a second embodiment will be described. The second embodiment is different from the first embodiment in that a region where an elastic wave generation source S is positioned is determined by comparing waveform information of one AE sensor 210A with information registered in a database in place of comparing waveform information of a plurality of AE sensors 210A and 210B. A configuration other than that described below is similar to that of the first embodiment.

Figure 17A:
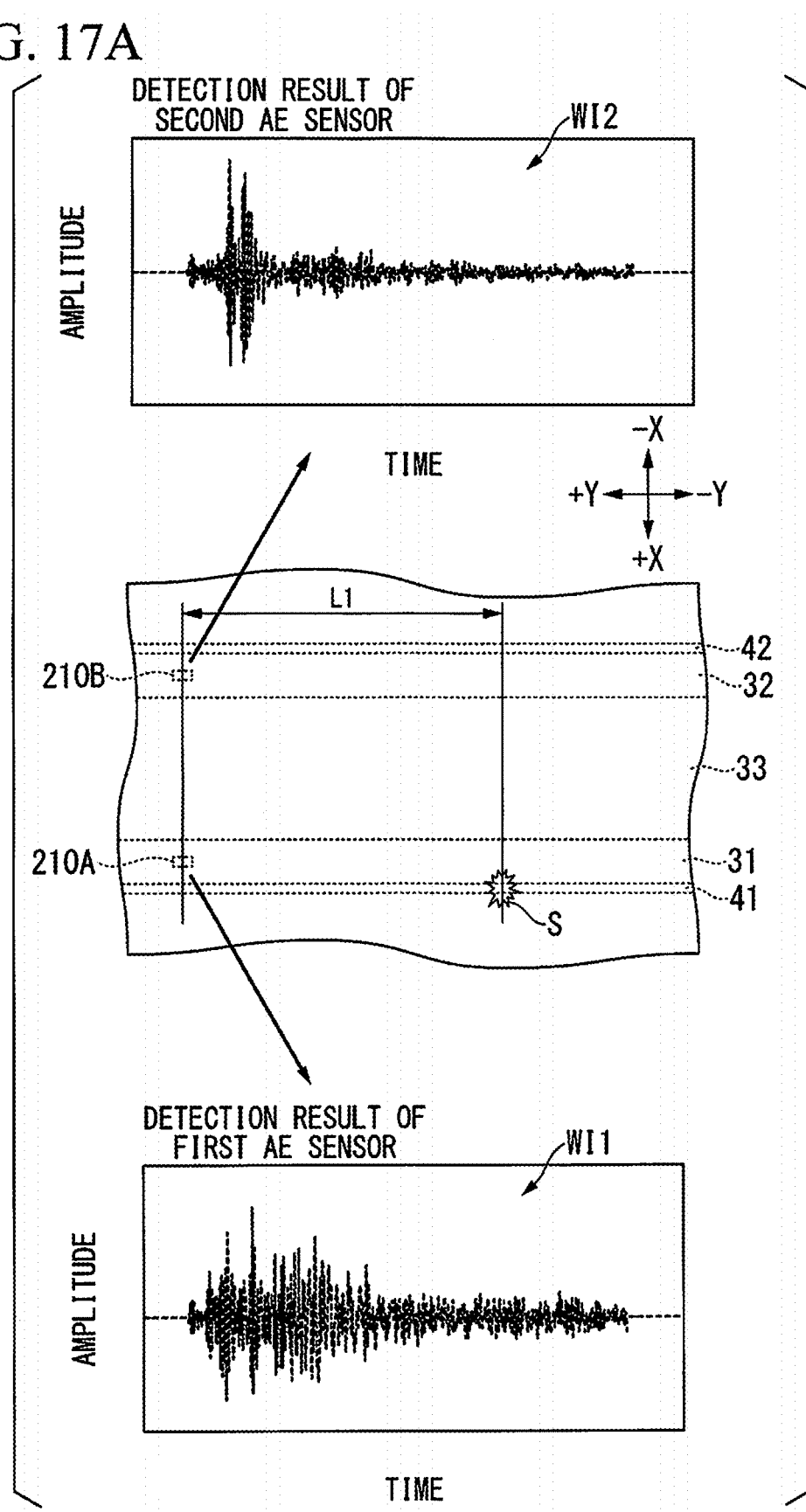
FIG. 17A is a diagram illustrating a principle of determining a region where an elastic wave generation source is positioned according to a second embodiment.
Figure 17B:
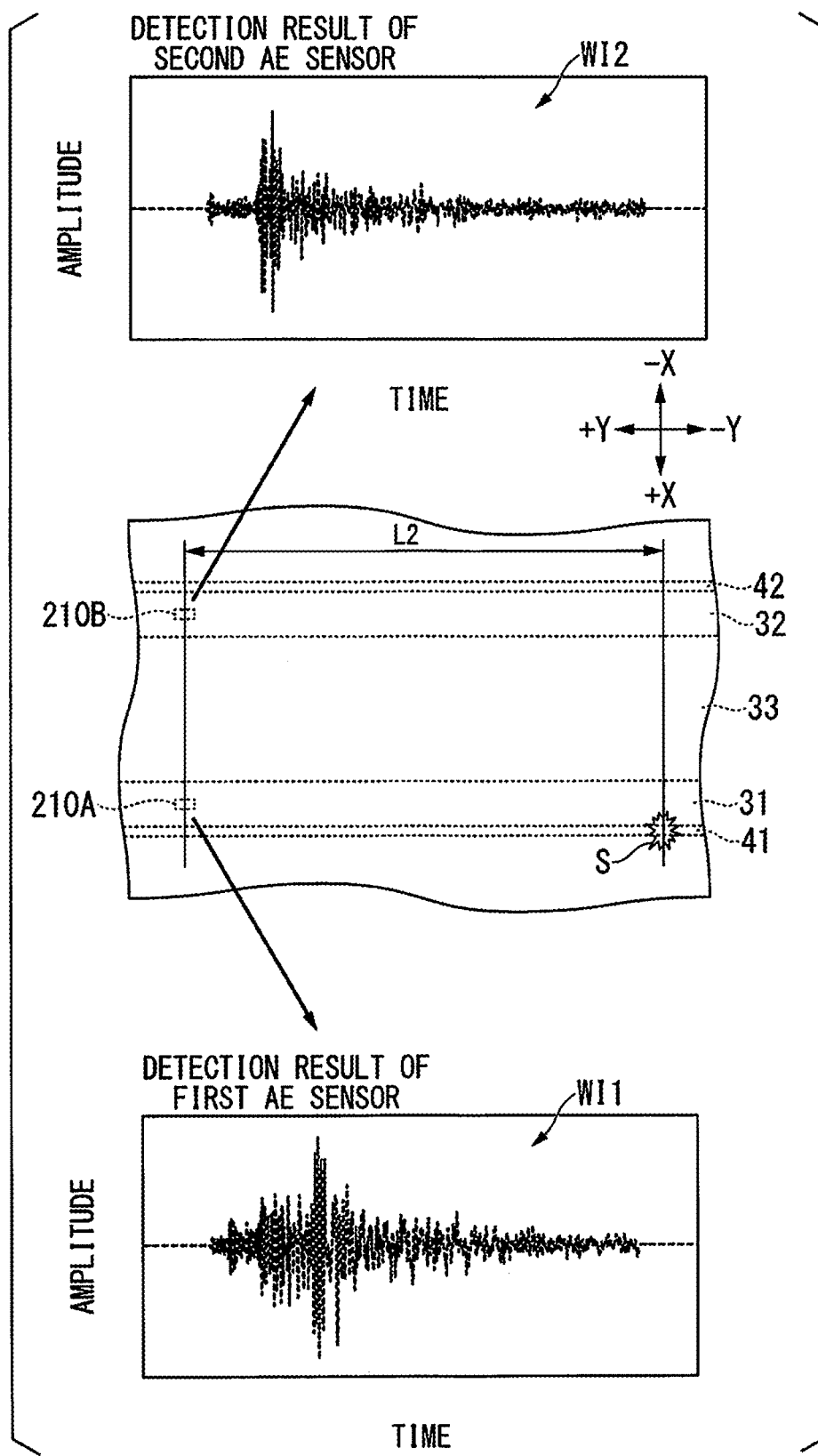
FIG. 17B is a diagram illustrating a principle of determining a region where the elastic wave generation source is positioned according to the second embodiment.

FIGS. 17A and 17B are diagrams illustrating a principle of determining the region where the elastic wave generation source S is positioned according to the present embodiment. FIG. 17A is an example illustrating a case in which the first and second AE sensors 210A and 210B are separated from the elastic wave generation source S by a first distance L1. A lower portion in FIG. 17A illustrates an example of the detection result of the first AE sensor 210A. An upper portion in FIG. 17A illustrates an example of the detection result of the second AE sensor 210B.

On the other hand, FIG. 17B is an example illustrating a case in which the first and second AE sensors 210A and 210B are separated from the elastic wave generation source S by a second distance L2. The second distance L2 is, for example, greater than the first distance L1. A lower portion in FIG. 17B illustrates an example of the detection result of the first AE sensor 210A. An upper portion in FIG. 17B illustrates an example of the detection result of the second AE sensor 210B.

As is apparent from a comparison between FIGS. 17A and 17B, the detection result of the AE sensor 210 is different when the distance from the elastic wave generation source S to the AE sensor 210 changes. A detection system 100 of the present embodiment uses this principle to determine the region where the elastic wave generation source S is positioned.

FIG. 18 is a plan view illustrating an arrangement example of the AE sensors 210A and 210C of the present embodiment.

The detection system 100 of the present embodiment may have, for example, only two AE sensors 210A and 210C (first and second AE sensors 210A and 210C) instead of four AE sensors 210A, 210B, 210C, and 210D. The two AE sensors 210A and 210C are collectively disposed on one side of a U-rib 23. In the present embodiment, for example, both of the two AE sensors 210A and 210C are attached to a first upright portion 31.

Figure 19:
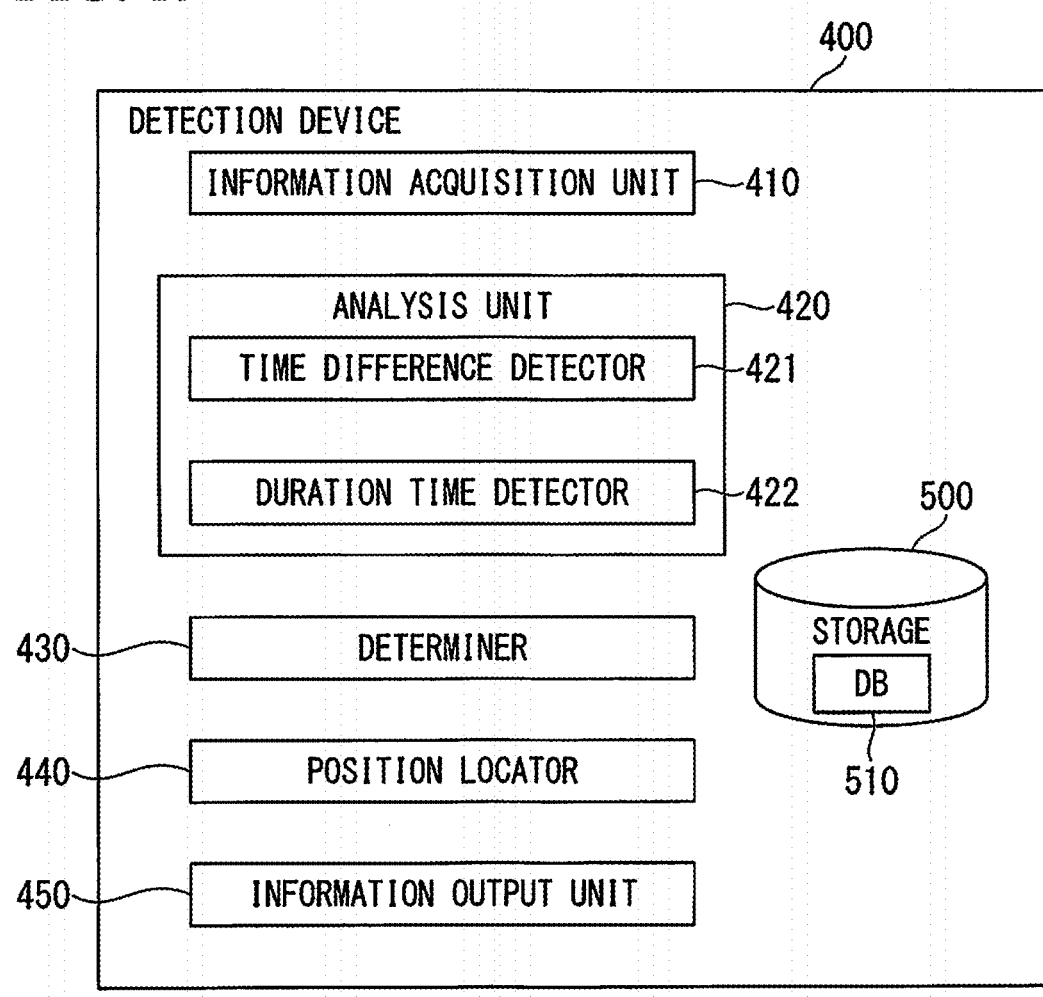
FIG. 19 is a block diagram illustrating a system configuration of a detection device according to the second embodiment.

FIG. 19 is a block diagram illustrating a system configuration of a detection device 400 of the present embodiment. The detection device 400 has a storage 500 in addition to the configuration of the first embodiment. The storage 500 is, for example, a solid state drive (SSD), a hard disk drive (HDD), a read only memory (ROM), or the like, but the present invention is not limited thereto. In the storage 500, a database 510 prepared in advance (hereinafter referred to as a "DB 510") is stored.

FIG. 20 is a diagram illustrating an example of details of the DB 510. For each of a plurality of positions (for example, a plurality of positions on the first and second welded portions 41 and 42) in an inspection target region R, position information about the positions (coordinates in X and Y directions) and a simulation result (a calculated value) of the output value of each AE sensor 210 when elastic waves are assumed to be generated at the position are associated and registered in the DB 510. The simulation result of the output value of each AE sensor 210 includes, for example, a "time difference", a "duration time", and "amplitude".

For example, a simulation result of a first time difference TD1, a simulation result of a first duration time TC1, and a simulation result of amplitude of a waveform included in first waveform information WI1 are registered in the DB 510 as simulation results related to the AE sensor 210A. Also, the "amplitude" may be maximum amplitude or average amplitude included in the waveform. Also, simulation results similar to the above are also calculated and registered in advance for the AE sensor 210C. Also, hereinafter, an example in which a determination process of a determiner 430 is performed using the simulation results related to the AE sensor 210A will be described. In the present embodiment, for example, a position locator 440 locates the position of the elastic wave generation source S before the determination of the determiner 430. In other words, the position locator 440 locates the position of the elastic wave generation source S on the basis of a time difference between arrival times of elastic waves (for example, direct waves) for the two AE sensors 210A and 210C and a propagation speed of elastic waves in the U-rib 23. In this case, the position locator 440 locates a first position candidate in the first welded portion 41 and a second position candidate in the second welded portion 42 as a result of determining the position of the elastic wave generation source S.

The determiner 430 of the present embodiment acquires a simulation result corresponding to the first position candidate (a simulation result in a case in which the elastic wave generation source S is present in the first position candidate) and a simulation result corresponding to the second position candidate (a simulation result in a case in which the elastic wave generation source S is present in the second position candidate) from the DB 510. Then, the determiner 430 compares the simulation result corresponding to the first position candidate and the simulation result corresponding to the second position candidate with an actual measurement value of the output of the AE sensor 210A. For example, the determiner 430 compares at least one of the first time difference TD1, the first duration time TC1, and the amplitude when the elastic wave generation source S1 is assumed to be in each of the first position candidate and the second position candidate with an actual measurement value of at least one of the first time difference TD1, the first duration time TC1, and the amplitude.

The determiner 430 determines that the elastic wave generation source S is present in the first position candidate when the simulation result corresponding to the first position candidate between the simulation result corresponding to the first position candidate and the simulation result corresponding to the second position candidate is close to the actual measurement value of the output of the AE sensor 210A. On the other hand, the determiner 430 determines that the elastic wave generation source S is present in the second position candidate when the simulation result corresponding to the second position candidate between the simulation result corresponding to the first position candidate and the simulation result corresponding to the second position candidate is close to the actual measurement value of the output of the AE sensor 210A.

According to such a configuration, even when the AE sensor 210 is disposed only on one side of the U-rib 23, it is possible to accurately determine which of the first welded portion 41 and the second welded portion 42 is the elastic wave generation source S. Thereby, it is possible to improve accuracy in determining a deterioration position.

Third Embodiment

Next, a third embodiment will be described. The third embodiment is different from the first embodiment in that one AE sensor 210A is used to determine a region where an elastic wave generation source S is positioned. A configuration other than those described below is similar to that of the first embodiment.

Figure 21:
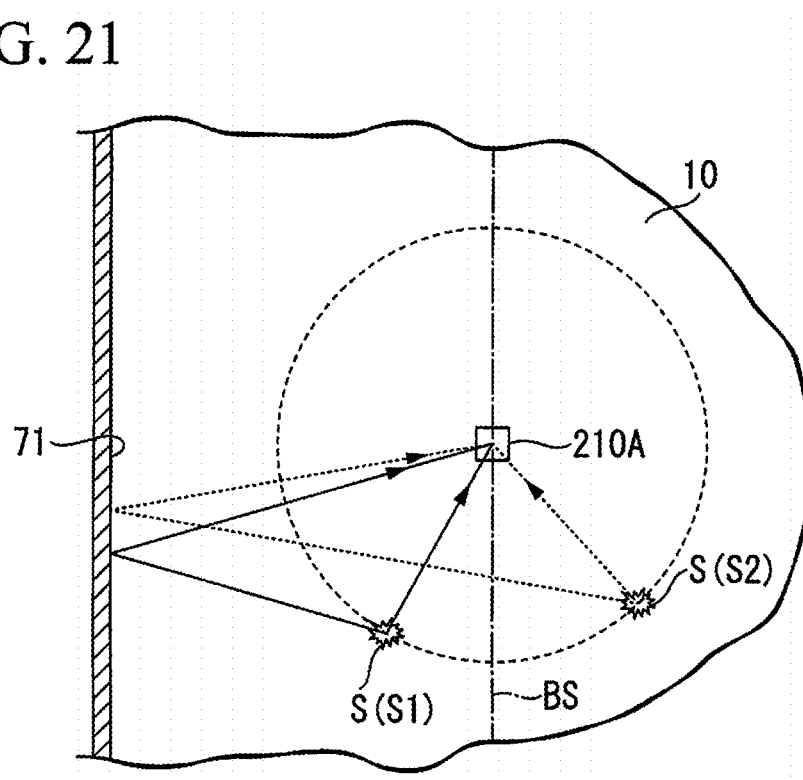
FIG. 21 is a plan view illustrating a determination by a determiner according to a third embodiment.

FIG. 21 is a plan view illustrating a position determination by the determiner 430 of the present embodiment.

For example, when elastic waves are generated from elastic wave generation sources S1 and S2 which are approximately equidistant from the AE sensor 210A, direct waves are input to the AE sensor 210A at approximately the same time. On the other hand, even though the elastic wave generation sources S1 and S2 are positioned at approximately equal distances from the AE sensor 210A, a time difference in an input of reflected waves for the AE sensor 210A occurs according to positions of the generation sources S1 and S2 for a reflection surface 71. Thus, even when the elastic wave generation sources S1 and S2 are positioned at approximately equal distances from the AE sensor 210A, there are differences in the time difference TD1 and the duration time TC1 described above.

In the present embodiment, the determiner 430 roughly determines a region where the elastic wave generation source S is positioned on the basis of waveform information WI1 obtained from a detection result of the AE sensor 210A. For example, the determiner 430 determines whether or not the elastic wave generation source S is positioned on a side opposite to the reflection surface 71 with respect to a reference plane BS or is positioned between the reference plane BS and the reflection surface 71, with respect to a virtual reference plane BS approximately parallel to the reflection surface 71 passing through the AE sensor 210A.

In the present embodiment, the detection device 400 has a storage 500 in which a DB 510 is registered as in the second embodiment. For each of a plurality of positions in an inspection target region R, position information about the positions (coordinates in the X and Y directions) and a simulation result (a calculated value) of the output value of each AE sensor 210A when elastic waves are assumed to be generated at the position are associated and registered in the DB 510.

In the present embodiment, the determiner 430 determines a region where the elastic wave generation source S is positioned in an inspection target region R on the basis of a comparison between a simulation result corresponding to each of a plurality of positions in the inspection target region R and an actual measurement value of the output of the AE sensor 210A as in the second embodiment. That is, the determiner 430 determines a region including a position closest to the actual measurement value of the output of the AE sensor 210A among the simulation results corresponding to the plurality of positions in the inspection target area R as a region where the elastic wave generation source S is positioned.

According to such a configuration, it is also possible to improve accuracy in determining a deterioration position.

Fourth Embodiment

Next, a fourth embodiment will be described. The fourth embodiment is different from the third embodiment in that one AE sensor 210A is used to one-dimensionally locate a position of an elastic wave generation source S. A configuration other than those described below is similar to that of the third embodiment.

Figure 22:
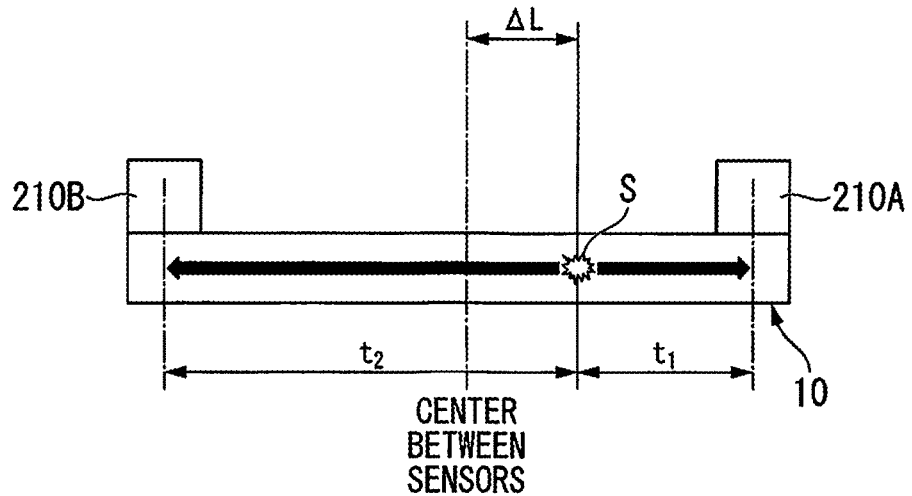
FIG. 22 is a view illustrating a principle of locating a position of an elastic wave generation source according to a fourth embodiment.

FIG. 22 is a diagram illustrating a principle of locating a position of the elastic wave generation source S according to the fourth embodiment. Generally, it is possible to locate a position of the elastic wave generation source S on the basis of the following Eq. (1) by installing two AE sensors 210A and 210B as illustrated in FIG. 22 and measuring an arrival time difference $\Delta t$ of elastic waves for the two AE sensors 210A and 210B in a process of one-dimensionally locating a position of the elastic wave generation source S.

$$\Delta L = (1/2) \times \Delta t \times C \quad (1)$$

Here, $\Delta L$ is a distance from a center between the two sensors 210A and 210B to the position of the elastic wave generation source S. t1 indicates an arrival time of elastic waves for the AE sensor 210A. t2 indicates an arrival time of elastic waves for the AE sensor 210B. $\Delta t$ is a time difference (t2−t1) between the arrival times of the elastic waves for the two AE sensors 210A and 210B. C is a propagation speed of elastic waves in a structure 10.

Figure 23:
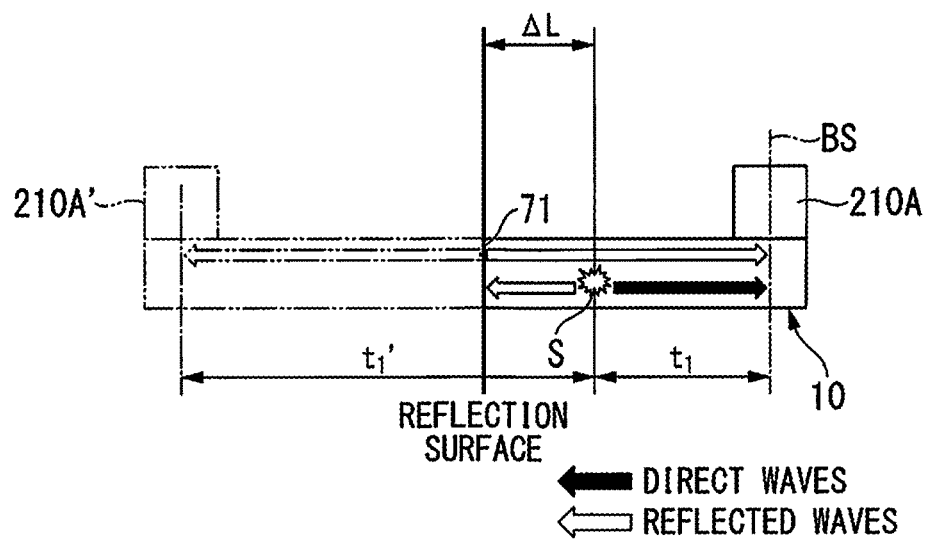
FIG. 23 is a view illustrating a process of locating a position of the elastic wave generation source according to the fourth embodiment.

FIG. 23 is a diagram illustrating a process of locating a position of the elastic wave generation source S according to the fourth embodiment. When there is a reflection surface 71 for reflecting the elastic waves in the structure 10, it is possible to locate a one-dimensional position of the elastic wave generation source S in one AE sensor 210A by assuming a virtual AE sensor 210A' having a mirror image relationship with the AE sensor 210A with respect to the reflection surface 71.

Specifically, in the present embodiment, a determiner 430 of a detection device 400 also has a function of a position locator 440. Then, the determiner 430 locates the position of the elastic wave generation source S on the basis of information indicating a position of the AE sensor 210A, information indicating a mirror image position of the AE sensor 210A with respect to the reflection surface 71 (information indicating a positional relationship between the reflection surface 71 and the AE sensor 210A) and first waveform information WI1. The "information indicating the mirror image position of the AE sensor 210A with respect to the reflection surface 71" is information for identifying a position of the virtual AE sensor 210A'.

In the present embodiment, the determiner 430 locates the position of the elastic wave generation source S on the basis of an arrival time of direct waves of elastic waves for the AE sensor 210A (an arrival time of a first peak group PA1) and an arrival time of reflected waves of elastic waves reflected on the reflection surface 71 for the AE sensor 210A (an arrival time of a second peak group PA2). This corresponds to a process of locating the position of the elastic wave generation source S on the basis of the arrival time of the elastic waves for the AE sensor 210A and the arrival time of the elastic waves for the virtual AE sensor 210A'.

Specifically, the determiner 430 calculates a time difference $\Delta t$ between the arrival time of the direct waves of the elastic waves for the AE sensor 210A and the arrival time of the reflected waves of the elastic waves reflected on the reflection surface 71 for the AE sensor 210A and locates the position of the elastic wave generation source S on the basis of the following Eq. (2).

$$\Delta L = (1/2) \times \Delta t \times C \quad (2)$$

Here, $\Delta L$ is a distance from the reflection surface 71 to the position of the elastic wave generation source S. t0 indicates an arrival time of direct waves for the AE sensor 210A. t1' indicates an arrival time of reflected waves for the AE sensor 210A. $\Delta t$ is a time difference (t1'−t1) between the arrival time of the direct waves for the AE sensor 210A and the arrival time of the reflected waves. C is a propagation speed of elastic waves in the structure 10.

According to such a configuration, it is also possible to improve accuracy in determining the deterioration position. Also, in the present embodiment, for example, when the elastic wave generation source S is positioned between a reference BS (a virtual surface approximately parallel to the reflection surface 71 passing through the AE sensor 210A) and the reflection surface 71, the position of the elastic wave generation source S can be located by a smaller number of AE sensors.

Fifth Embodiment

Next, a fifth embodiment will be described. The fifth embodiment is different from the fourth embodiment in that two AE sensors 210A and 210B are used to two-dimensionally locate a position of an elastic wave generation source S. Also, a configuration other than those described below is similar to that of the fourth embodiment.

Figure 24:
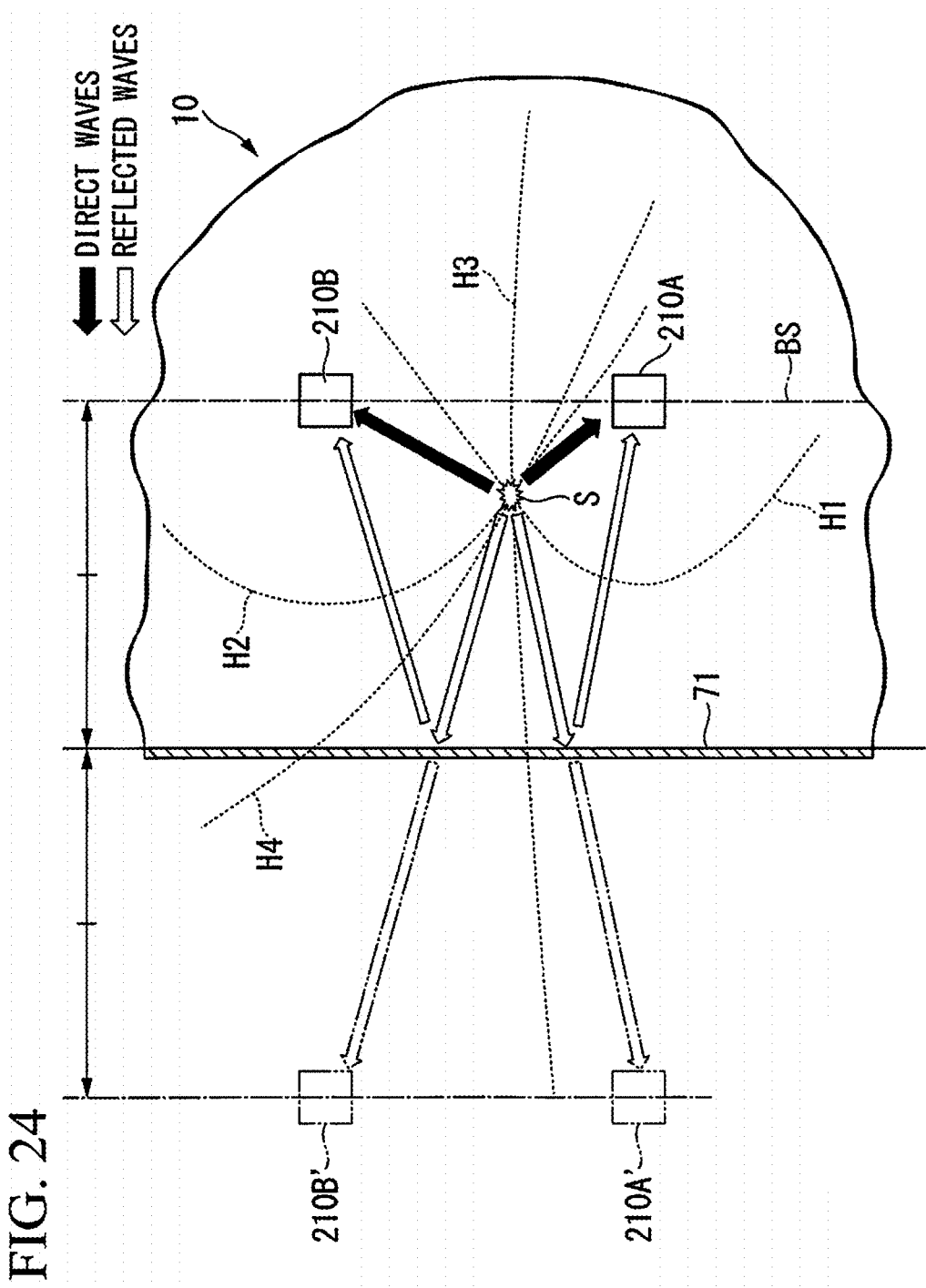
FIG. 24 is a view illustrating a process of locating a position of an elastic wave generation source according to a fifth embodiment.

FIG. 24 is a diagram illustrating a process of locating the position of the elastic wave generation source S according to the fifth embodiment. Here, at least three sensors are required to two-dimensionally locate the position of the elastic wave generation source S normally. On the other hand, in the present embodiment, when there is a reflection surface 71 for reflecting elastic waves in a structure 10, it is possible to two-dimensionally locate the position of the elastic wave generation source S in the two AE sensors 210A and 210B by assuming a virtual AE sensor 210A' (hereinafter referred to as a first virtual AE sensor 210A') having a mirror image relationship with the AE sensor 210A with respect to the reflection surface 71 and a virtual AE sensor 210B' (hereinafter referred to as a second virtual AE sensor 210B') having a mirror image relationship with the second AE sensor 210B with respect to the reflection surface 71.

Specifically, in the present embodiment, a determiner 430 locates the position of the elastic wave generation source S on the basis of information indicating the position of the first AE sensor 210A, information indicating the mirror image position of the first AE sensor 210A with respect to the reflection surface 71 (information indicating a positional relationship between the reflection surface 71 and the first AE sensor 210A), first waveform information WI1, information indicating the position of the second AE sensor 210B, information indicating the mirror image position of the second AE sensor 210B with respect to the reflection surface 71 (information indicating a positional relationship between the reflection surface 71 and the second AE sensor 210B), and second waveform information WI2. The "information indicating the mirror image position of the first AE sensor 210A with respect to the reflection surface 71" is information for identifying a position of a first virtual AE sensor 210A'. Likewise, the "information indicating the mirror image position of the second AE sensor 210B with respect to the reflection surface 71" is information for identifying a position of a second virtual AE sensor 210B'.

In the present embodiment, the determiner 430 locates the position of the elastic wave generation source S on the basis of at least three of an arrival time of direct waves of elastic waves for the first AE sensor 210A (an arrival time of a first peak group PA1), an arrival time of reflected waves of elastic waves reflected on the reflection surface 71 for the first AE sensor 210A (an arrival time of a second peak group PA2), an arrival time of direct waves of elastic waves for the second AE sensor 210B (an arrival time of a first peak group PB1), and an arrival time of reflected waves of elastic waves reflected on the reflection surface 71 for the second AE sensor 210B (an arrival time of a second peak group PB2). This corresponds to a process of locating the position of the elastic wave generation source S on the basis of at least three of an arrival time of elastic waves for the first AE sensor 210A, an arrival time of elastic waves for the first virtual AE sensor 210A', an arrival time of elastic waves for the second AE sensor 210B, and an arrival time of elastic waves for the second virtual AE sensor 210B'.

Specifically, a hyperbolic curve H1 illustrated in FIG. 24 is a line on which a time difference between the arrival time of the elastic waves for the first AE sensor 210A and the arrival time of the elastic waves for the first virtual AE sensor 210A' (i.e., a time difference between the arrival times of the direct waves and the reflected waves for the first AE sensor 210A) becomes constant. On the other hand, a hyperbolic curve H2 in FIG. 24 is a line on which a time difference between the arrival time of the elastic waves for the second AE sensor 210B and the arrival time of the elastic waves for the second virtual AE sensor 210B' (i.e., a time difference between the arrival times of the direct waves and the reflected waves for the second AE sensor 210B) becomes constant. The determiner 430 may locate an intersection of the hyperbolic curve H1 and the hyperbolic curve H2 as the position of the elastic wave generation source S.

Also, instead of the above example, the determiner 430 may calculate a hyperbolic curve H3 on which a time difference between the arrival time of the elastic waves (the direct waves) for the first AE sensor 210A and the arrival time of the elastic waves (the direct waves) for the second AE sensor 210B becomes constant and locate an intersection between the hyperbolic curve H1 and the hyperbolic curve 113 as the position of the elastic wave generation source S. Also, instead of the above example, the determiner 430 may calculate a hyperbolic curve H4 on which a time difference between the arrival time of the elastic waves (the direct waves) for the second AE sensor 210B and the arrival time of the elastic waves (the direct waves) for the first virtual AE sensor 210A' (i.e., the arrival time of the reflected waves of the first AE sensor 210A) becomes constant and identify an intersection between the hyperbolic curve H1 and the hyperbolic curve H4 as the position of the elastic wave generation source S. However, the hyperbolic curve of the arrival time difference used for locating the position of the elastic wave generation source S is not limited to the above example and may be a hyperbolic curve related to another combination of two AE sensors 210 selected from the first AE sensor 210A, the first virtual AE sensor 210A', the second AE sensor 210B, and the second virtual AE sensor 210B'.

According to such a configuration, it is also possible to improve accuracy in determining a deterioration position. Also, in the present embodiment, a two-dimensional position of the elastic wave generation source S can be located by a smaller number of AE sensors 210. Also, it is unnecessary to dispose the first and second AE sensors 210A and 210B side by side on a reference plane BS. However, when the first and second AE sensors 210A and 210B are disposed side by side on the reference plane BS and the elastic wave generation source S is present between the reference plane BS and the reflecting plane 71, the two-dimensional position of the elastic wave generation source S can be located by a smaller number of AE sensors 210 with higher accuracy. For example, when the elastic wave generation source S is positioned in a region surrounded by the two AE sensors 210A and 210B and the reference plane BS, a two-dimensional position of the elastic wave generation source S can be located by a smaller number of AE sensors 210 with higher accuracy.

Also, in addition to a configuration of the fifth embodiment, for example, when another AE sensor 210 is disposed in a direction intersecting a virtual plane on which the first AE sensor 210A and the second AE sensor 20B are disposed (for example, a direction approximately orthogonal to the virtual plane, i.e., a depth direction of the paper surface in FIG. 24), a configuration in which a total of six AE sensors 210 are disposed is obtained according to the AE sensor 210 and a virtual AE sensor having a mirror image relationship with the AE sensor 210. It is possible to locate a three-dimensional position of the elastic wave generation source S in a smaller number of AR sensors by performing calculation using the above-described hyperbolic curve in relation to these AE sensors 210.

Sixth Embodiment

Next, a sixth embodiment will be described. The sixth embodiment is different from the first embodiment in that an AE sensor 210 is attached to a structure 15 related to a roller bearing rather than a steel plate deck. A configuration other than those described below is similar to that of the first embodiment.

Figure 25:
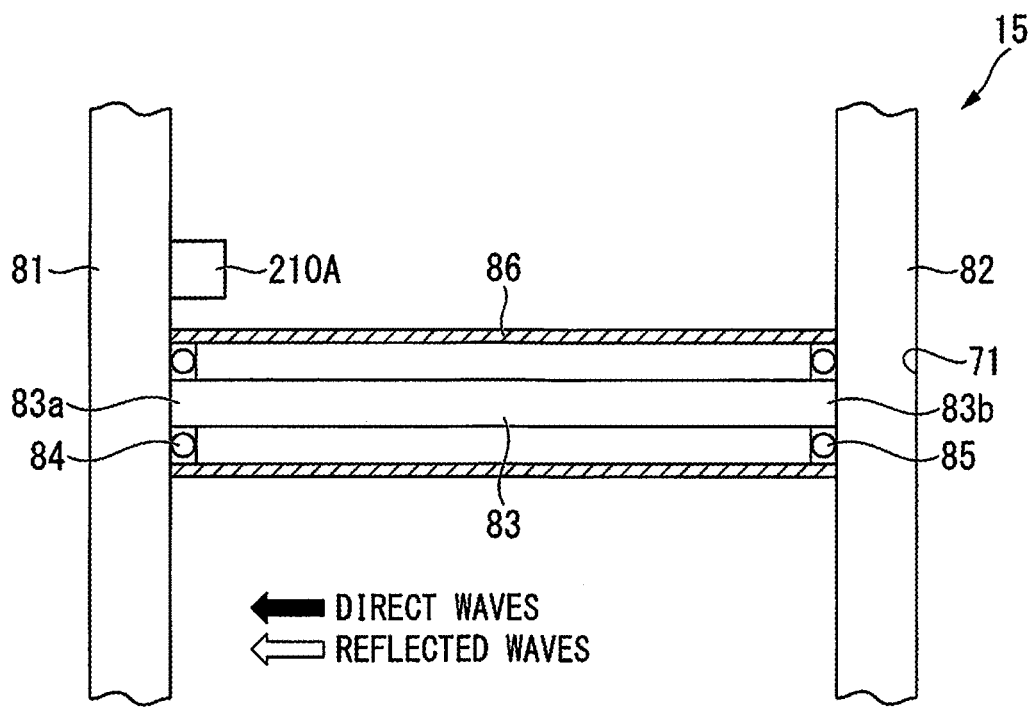
FIG. 25 is a cross-sectional view illustrating a structure according to a sixth embodiment.

FIG. 25 is a cross-sectional view illustrating the structure 15 according to the sixth embodiment. The structure 15 is an example of a structure whose deterioration state is detected by a detection system 100. The structure 15 is, for example, a roller facility used for paper feeding, winding of objects, conveyance of objects, and the like. The structure 15 includes, for example, a first wall 81, a second wall 82, a shaft 83, a first bearing 84, a second bearing 85, and a roller 86.

The first wall 81 and the second wall 82 are disposed so that they are separated to form a space therebetween. An outer surface of a part of the second wall 82 forms a reflection surface 71. The shaft 83 extends between the first wall 81 and the second wall 82. The shaft 83 has a first end 83*a* and a second end 83*b* positioned on a side opposite to the first end 83*a*. The first end 83*a* is fixed to the first wall 81. The second end 83*b* is fixed to the second wall 82.

The first bearing 84 is attached to the first end 83*a* of the shaft 83. The second bearing 85 is attached to the second end 83*b* of the shaft 83. The roller 86 is formed in a hollow cylindrical shape. The roller 86 is disposed on outer peripheral sides of the first bearing 84 and the second bearing 85 and is supported by the first bearing 84 and the second bearing 85. Accordingly, the roller 86 is rotatable with respect to the first wall 81 and the second wall 82. For example, the AE sensor 210A is attached to the first wall 81.

In the present embodiment, when a malfunction occurs in the first bearing 84 or the second bearing 85, elastic waves generated from the first bearing 84 or the second bearing 85 are detected by an AE sensor 210A.

Information about a peak group (a first peak group PA) related to direct waves of elastic waves propagating to the first side wall 81 via the shaft 83 is input to the AE sensor 210A. Also, information about a peak group (a second peak group PA) related to reflected waves propagating to the first wall 81 on which the AE sensor 210A is installed via the shaft 83 again after the elastic waves are reflected on the reflection surface of the second wall 82 that is present on a side opposite to the first wall 81 on which the AE sensor 210A is installed along the shaft 83 is input to the AE sensor 210A.

Figure 26:
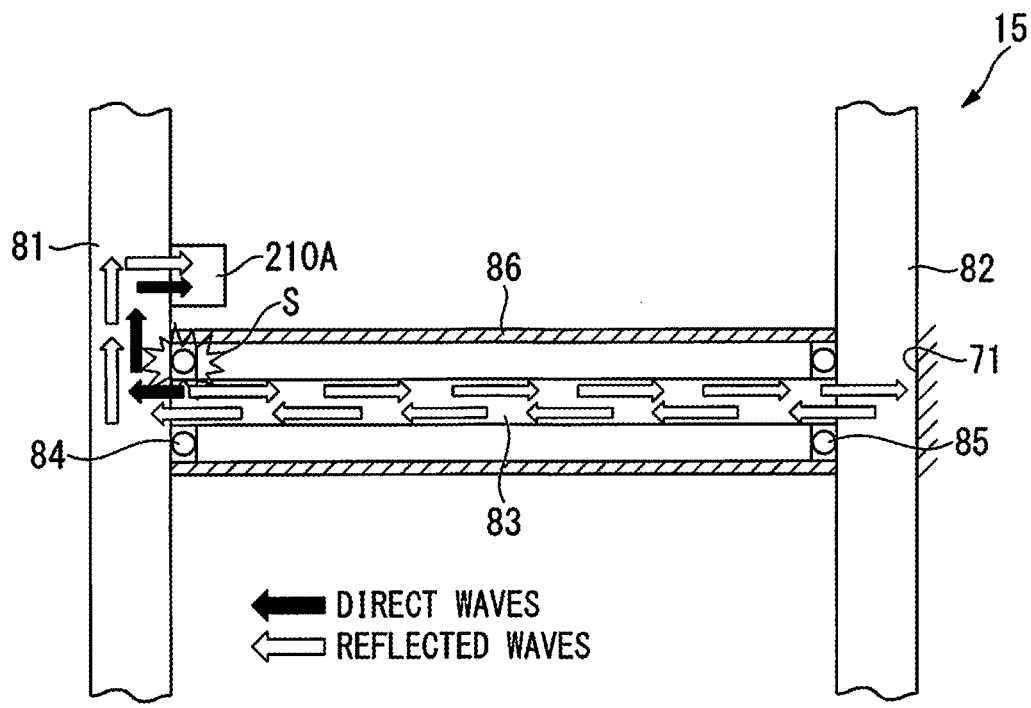
FIG. 26 is a cross-sectional view illustrating propagation behavior of elastic waves when a first bearing of a sixth embodiment serves as an elastic wave generation source according to the sixth embodiment.
Figure 27:
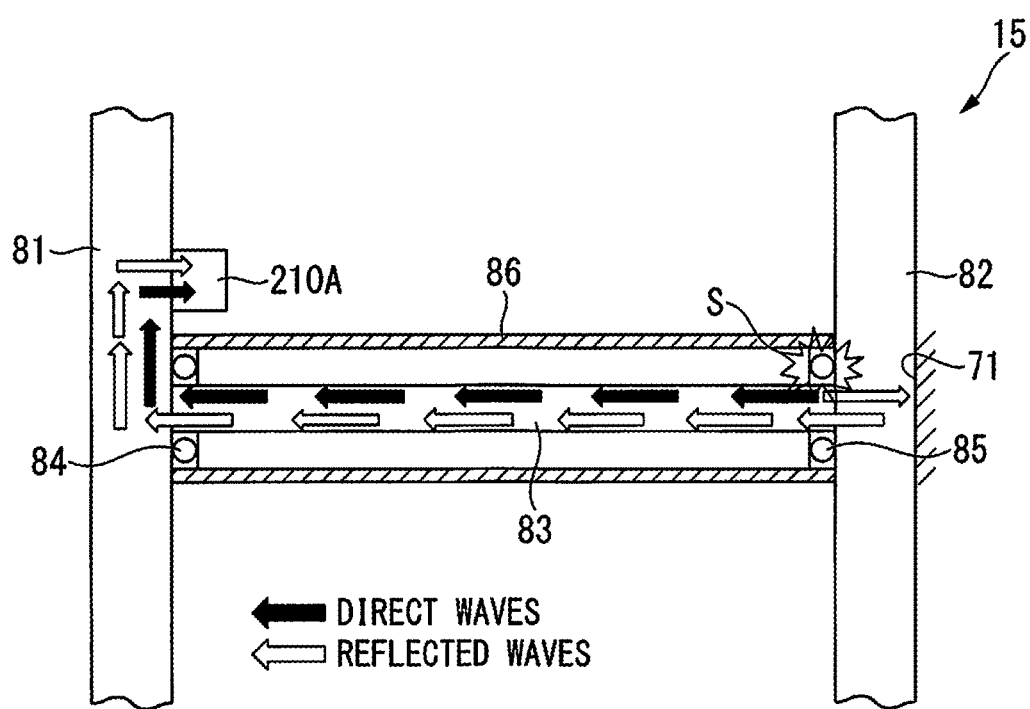
FIG. 27 is a cross-sectional view illustrating propagation behavior of elastic waves when a second bearing serves as an elastic wave generation source according to the sixth embodiment.

FIG. 26 is a cross-sectional view illustrating propagation behavior of the elastic waves when a malfunction occurs in the first bearing 84 and the first bearing 84 serves as the elastic wave generation source S. In FIGS. 26 and 27, a portion adjacent to the reflection surface 71 is hatched for illustrative clarity of the reflection surface 71. However, another member may be present or absent next to the second wall 82.

As illustrated in FIG. 26, when the first bearing 84 serves as the elastic wave generation source S, a time difference between arrival times of direct waves and reflected waves of the elastic waves for the AE sensor 210A is long and a duration time for which an output value of the AE sensor 210A continuously exceeds a certain threshold value is long because a distance from the elastic wave generation source S to the reflection surface 71 is long.

FIG. 27 is a cross-sectional view illustrating propagation behavior of the elastic waves when a malfunction occurs in the second bearing 85 and the second bearing 85 serves as the elastic wave generation source S. As illustrated in FIG. 27, when the second bearing 85 is the elastic wave generation source S, a time difference between arrival times of direct waves and reflected waves of the elastic waves for the AE sensor 210A is short and a duration time for which the output value of the AE sensor 210A continuously exceeds the certain threshold value is short because a distance from the elastic wave generation source S to the reflection surface 71 is short.

In the present embodiment, the determiner 430 determines a region where the elastic wave generation source S is positioned on the basis of the first waveform information WI1 included in the output result of the AE sensor 210A. For example, the determiner 430 determines a region where the elastic wave generation source S is positioned on the basis of at least one of a time difference TD1 and a duration time TC1. For example, the determiner 430 determines whether the elastic wave generation source S is the first bearing 84 or the second bearing 85.

According to such a configuration, it is also possible to improve accuracy in determining the deterioration position. Also, although a double-supported roller in which the shaft 83 is supported by the two walls 81 and 82 has been described in the present embodiment, the roller may be a cantilevered roller. In this case, an end surface of a free end of the cantilevered shaft 83 becomes the reflection surface 71.

Although several embodiments have been described above, the embodiments are not limited to the above examples. For example, it is unnecessary to provide the storage 500 holding the DB 510 inside the detection device 400. The detection device 400 may be able to refer to the DB 510 via a network.

According to at least one embodiment described above, when waveform information including a plurality of peak groups related to one elastic wave is included, the detection system determines a region where the elastic wave generation source is positioned on the basis of the waveform information. According to such a configuration, it is possible to improve accuracy in determining the deterioration position.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A detection system comprising:
    a first sensor configured to detect elastic waves; and
    a determiner configured to determine a region where an elastic wave generation source is positioned on the basis of first waveform information of the elastic wave detected by at least the first sensor if the first waveform information including a plurality of peak groups related to one elastic wave is included in a detection result of the first sensor.

2. A detection system comprising:
    a first sensor configured to detect elastic waves; and
    a determiner configured to determine a region where an elastic wave generation source is positioned on the basis of first waveform information if the first waveform information including a plurality of peak groups related to one elastic wave is included in a detection result of the first sensor,
    wherein the first sensor is attached to a structure including a first reflection surface that is configured to reflect at least some of the elastic waves, and
    wherein the determiner determines the region where the elastic wave generation source is positioned on the basis of information detected by the first sensor before the elastic waves are reflected on the first reflection surface and information detected by the first sensor after the elastic waves are reflected on the first reflection surface.

3. The detection system according to claim 1,
    wherein the first sensor is attached to a structure including a first reflection surface that is configured to reflect at least some of the elastic waves, and
    wherein the determiner determines the region where the elastic wave generation source is positioned on the basis of a result of detecting direct waves of the elastic waves transferred from the elastic wave generation source to the first sensor and a result of detecting reflected waves of the elastic waves emitted from the elastic wave generation source, reflected on the first reflection surface, and transferred to the first sensor among detection results of the first sensor.

4. The detection system according to claim 2, wherein the determiner determines whether the elastic wave generation source is positioned on a side opposite to the first reflection surface with respect to an ideal reference plane or positioned between the reference plane and the first reflection surface with respect to the reference plane that passes through the first sensor and extends in approximately parallel to the first reflection surface.

5. The detection system according to claim 2, wherein the determiner locates a position of the elastic wave generation source on the basis of information indicating a position of the first sensor, information indicating a mirror image position of the first sensor for the first reflection surface, and the first waveform information.

6. The detection system according to claim 2, further comprising a second sensor configured to detect the elastic waves,
wherein the determiner two-dimensionally locates a position of the elastic wave generation source on the basis of information indicating a position of the second sensor, information indicating a mirror image position of the second sensor for the first reflection surface, and second waveform information including a plurality of peak groups related to the elastic waves included in a detection result of the second sensor in addition to information indicating a position of the first sensor, information indicating a mirror image position of the first sensor for the first reflection surface, and the first waveform information.

7. The detection system according to claim 2,
wherein the structure further includes a second reflection surface,
wherein the first sensor is disposed at a position other than a midpoint between the first reflection surface and the second reflection surface, and
wherein the determiner determines whether the elastic wave generation source is positioned close to the first reflection surface or the second reflection surface.

8. The detection system according to claim 7,
wherein the elastic wave generation source is the first reflection surface or the second reflection surface, and
wherein the determiner determines whether the elastic wave generation source is positioned in the vicinity of the first reflection surface or the second reflection surface.

9. The detection system according to claim 1, wherein the determiner determines the region where the elastic wave generation source is positioned on the basis of first information characterized by the plurality of peak groups.

10. The detection system according to claim 1, wherein the determiner determines the region where the elastic wave generation source is positioned on the basis of a first time difference between a first time corresponding to a first peak group included in the plurality of peak groups and a second time corresponding to a second peak group included in the plurality of peak groups.

11. The detection system according to claim 10, wherein the determiner determines the region where the elastic wave generation source is positioned on the basis of a calculated value of the first time difference when a position of the elastic wave generation source is assumed and an actual measurement value of the first time difference.

12. The detection system according to claim 1, wherein the determiner determines the region where the elastic wave generation source is positioned on the basis of a first duration time until an output value of the first sensor is attenuated to a first threshold value or less from a point in time at which the output value of the first sensor has exceeded the first threshold value when viewed through the plurality of peak groups.

13. The detection system according to claim 12, wherein the determiner determines the region where the elastic wave generation source is positioned on the basis of a calculated value of the first duration time when a position of the elastic wave generation source is assumed and an actual measurement value of the first duration time.

14. The detection system according to claim 1, further comprising a second sensor configured to detect the elastic waves,
wherein the determiner determines the region where the elastic wave generation source is positioned on the basis of the first waveform information and second waveform information when the second waveform information including a plurality of peak groups related to the elastic waves is included in a detection result of the second sensor.

15. The detection system according to claim 14, wherein the determiner determines the region where the elastic wave generation source is positioned on the basis of a first time difference between a first time corresponding to a first peak group included in the first waveform information and a second time corresponding to a second peak group included the first waveform information and a second time difference between a first time corresponding to a first peak group included in the second waveform information and a second time corresponding to a second peak group included in the second waveform information.

16. The detection system according to claim 14, wherein the determiner determines the region where the elastic wave generation source is positioned on the basis of a first duration time until an output value of the first sensor is attenuated to a first threshold value or less from a point in time at which the output value of the first sensor has exceeded the first threshold value when viewed through the plurality of peak groups included in the first waveform information and a second duration time until an output value of the second sensor is attenuated to a second threshold value or less from a point in time at which the output value of the second sensor has exceeded the second threshold value when viewed through the plurality of peak groups included in the second waveform information.

17. The detection system according to claim 14, further comprising a locating unit configured to locate a position of the elastic wave generation source on the basis of a detection result of a sensor for which an arrival time of the elastic waves is earlier between the first sensor and the second sensor.

18. The detection system according to claim 1,
wherein the detection system is a detection system configured to detect elastic waves generated in a steel plate deck having a deck plate and a U-rib extending in a bridge axis direction installed on a lower surface of the deck plate,
wherein the steel plate deck includes a first welded portion configured to extend in the bridge axis direction and fix a first end of the U-rib and the deck plate and a second welded portion configured to extend in the bridge axis direction and fix a second end of the U-rib and the deck plate, wherein the detection system further comprises a second sensor configured to detect the elastic waves, wherein the first sensor and the second sensor are disposed so that the first sensor and the second sensor are separated from each other in a direction intersecting the bridge axis direction and attached to a side surface of the U-rib, and wherein the determiner determines whether the elastic wave generation source is in the first welded portion or the second welded portion.

19. The detection system according to claim 18, wherein the determiner determines whether the elastic wave generation source is in the first welded portion or the second welded portion on the basis of waveform information detected by the first sensor and waveform information detected by the second sensor.

20. The detection system according to claim 19,
wherein the U-rib has a first upright portion and a second upright portion separated from each other in a direction intersecting the bridge axis direction, and
wherein the first sensor is attached to the first upright portion of the U-rib and the second sensor is attached to the second upright portion.

21. A detection device comprising:
a determiner configured to determine a region where an elastic wave generation source is positioned on the basis of first waveform information of the elastic wave detected by at least the first sensor if the first waveform information including a plurality of peak groups related to one elastic wave is included in a detection result of a first sensor configured to detect elastic waves.

22. A detection method comprising:
determining a region where an elastic wave generation source is positioned on the basis of first waveform information of the elastic wave detected by at least a first sensor if the first waveform information including a plurality of peak groups related to one elastic wave is included in a detection result of a first sensor configured to detect elastic waves.

23. A detection device comprising:
a determiner configured to determine a region where an elastic wave generation source is positioned on the basis of first waveform information if the first waveform information including a plurality of peak groups related to one elastic wave is included in a detection result of a first sensor configured to detect elastic waves,
wherein the first sensor is attached to a structure including a first reflection surface that is configured to reflect at least some of the elastic waves, and
wherein the determiner determines the region where the elastic wave generation source is positioned on the basis of information detected by the first sensor before the elastic waves are reflected on the first reflection surface and information detected by the first sensor after the elastic waves are reflected on the first reflection surface.

24. A detection method comprising:
determining a region where an elastic wave generation source is positioned on the basis of first waveform information if the first waveform information including a plurality of peak groups related to one elastic wave is included in a detection result of a first sensor configured to detect elastic waves,
wherein the first sensor is attached to a structure including a first reflection surface that is configured to reflect at least some of the elastic waves, and
wherein the detection method further comprising:
determining the region where the elastic wave generation source is positioned on the basis of information detected by the first sensor before the elastic waves are reflected on the first reflection surface and information detected by the first sensor after the elastic waves are reflected on the first reflection surface.

* * * * *

UNITED STATES PATENT AND TRADEMARK OFFICE
CERTIFICATE OF CORRECTION

PATENT NO. : 11,073,498 B2
APPLICATION NO. : 16/286764
DATED : July 27, 2021
INVENTOR(S) : Fumikura et al.

Page 1 of 1

It is certified that error appears in the above-identified patent and that said Letters Patent is hereby corrected as shown below:

In the Claims

Claim 24, Column 30, Line 32, "comprising:" should read as --comprises:--.

Signed and Sealed this
Ninth Day of August, 2022

Katherine Kelly Vidal
*Director of the United States Patent and Trademark Office*